US012406649B2

(12) United States Patent
Chen et al.

(10) Patent No.: US 12,406,649 B2
(45) Date of Patent: Sep. 2, 2025

(54) ACOUSTIC METASURFACE STRUCTURE

(71) Applicant: NATIONAL CHENG KUNG UNIVERSITY, Tainan (TW)

(72) Inventors: Jung-San Chen, Tainan (TW); Tzu-Huei Kuo, Tainan (TW); Wei-Chun Wang, Tainan (TW); Wen-Yang Lo, Tainan (TW); Cheng-Yi Wang, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 278 days.

(21) Appl. No.: 18/353,949

(22) Filed: Jul. 18, 2023

(65) Prior Publication Data

US 2025/0029589 A1 Jan. 23, 2025

(51) Int. Cl.
*G10K 11/172* (2006.01)
*G10K 11/162* (2006.01)
*G10K 11/36* (2006.01)

(52) U.S. Cl.
CPC .......... *G10K 11/172* (2013.01); *G10K 11/162* (2013.01); *G10K 11/36* (2013.01)

(58) Field of Classification Search
CPC ..... G10K 11/172; G10K 11/162; G10K 11/36
USPC .......................................................... 181/286
See application file for complete search history.

(56) References Cited

U.S. PATENT DOCUMENTS 4,107,626 A * 8/1978 Kiewit .................... G01L 1/165 331/107 A
4,135,603 A * 1/1979 Dean, III ............. G10K 11/172 428/116
4,562,901 A * 1/1986 Junger .................. E04B 1/8404 181/288
7,401,682 B2 * 7/2008 Proscia ................... F02K 1/827 239/265.17

(Continued)

FOREIGN PATENT DOCUMENTS

EP 1100071 A2 5/2001
EP 2677517 A1 12/2013

(Continued)

*Primary Examiner* — Forrest M Phillips
(74) *Attorney, Agent, or Firm* — Best & Flanagan LLP

(57) ABSTRACT

An acoustic metasurface structure is configured to absorb sounds. The acoustic metasurface structure comprises a main body, an externally-connecting configuration and an inner configuration. The externally-connecting configuration and the inner configuration are respectively formed inside the main body. An externally-connecting tube of the externally-connecting configuration is in fluid communication with an external environment and an externally-connecting cavity of the externally-connecting configuration. An inner tube of the inner configuration is in fluid communication with the externally-connecting cavity and an inner cavity of the inner configuration. With the externally-connecting configuration and the inner configuration forming a series-type structure in the main body, the acoustic metasurface structure increases an acoustic impedance. Therefore, under circumstances of the main body having a limited volume, frequencies, on which absorption coefficient peaks (Continued)

of the acoustic metasurface structure land, are lowered, and an absorption coefficient of the acoustic metasurface structure toward low frequencies is increased.

20 Claims, 22 Drawing Sheets

(56) References Cited

U.S. PATENT DOCUMENTS

| | | | | |
|---|---|---|---|---|
| 9,472,179 | B1* | 10/2016 | Cai | G10K 11/172 |
| 10,546,070 | B2* | 1/2020 | Hellat | G06F 30/00 |
| 11,551,656 | B2* | 1/2023 | Hakuta | G10K 11/172 |
| 2019/0029552 | A1 | 1/2019 | Perschbacher et al. | |
| 2019/0295522 | A1 | 9/2019 | Hakuta | |
| 2020/0014378 | A1 | 1/2020 | Ziemba et al. | |
| 2020/0143782 | A1 | 5/2020 | Honji | |
| 2020/0239125 | A1* | 7/2020 | Prakash | G10K 11/162 |
| 2020/0243058 | A1* | 7/2020 | Hakuta | G10K 11/172 |
| 2021/0127201 | A1* | 4/2021 | Lee | H04R 1/406 |
| 2022/0027772 | A1 | 1/2022 | Gohl et al. | |
| 2022/0277723 | A1 | 9/2022 | Goo et al. | |
| 2023/0009200 | A1 | 1/2023 | Wang et al. | |
| 2023/0092004 | A1 | 3/2023 | Hrudey et al. | |
| 2025/0182729 | A1* | 6/2025 | Baygun | G10K 11/172 |

FOREIGN PATENT DOCUMENTS

| | | | |
|---|---|---|---|
| JP | 2009198901 | A | 9/2009 |
| WO | 2019021480 | A1 | 1/2019 |

* cited by examiner

ACOUSTIC METASURFACE STRUCTURE

BACKGROUND OF THE INVENTION

1. Field of the Invention

The present invention relates to an acoustic metasurface structure, which is an acoustic structure configured to absorb low-frequency sounds, and especially to a super-low-frequency sound-absorbing panel.

2. Description of Related Art

In daily lives, lots of activities generate noises, such as people walking, transporting, music playing, and machine operating, etc. To decrease distractions from noises, a variety of noise absorbers is provided nowadays. For example, sound-absorbing plates, sound-absorbing structures using porous/micro-perforated panels cooperating with a resonant backed cavity, active noise absorbers, and mufflers which are made based on a theory of Helmholtz resonance.

Among that, the sound-absorbing plates are made of porous materials such as foam or fibers. Because of material properties, the sound-absorbing plates tend to absorb high-frequency sounds easily and have difficulty absorbing low-frequency sounds. The sound-absorbing structures, using porous/micro-perforated panels cooperating with a resonant backed cavity, are limited in space, so a volume of the resonant back cavity is limited, and hence the sound-absorbing structures are not easy to be applied in absorption of low-frequency noises. The active noise absorbers have complex circuit designs, so they are not easy to be produced and are costly.

Additionally, a muffler made based on the theory of Helmholtz resonance are broadly applied in noise absorptions of a medium-to-narrow frequency bandwidth in tunnels. The muffler comprises a hollow cavity and a neck connected to the cavity. The neck has an opening that is in fluid communication with an external environment. A Helmholtz resonance is a passive muffler and can be seen as a spring-mass system. The cavity is a spring and air in the neck is a mass. The Helmholtz resonance can trap and attenuate noises. A mechanism behind this is that if frequencies of the noises match resonant frequencies of the resonance, the air in the neck vibrates violently, so an energy of the noises is attenuated. The Helmholtz resonance is widely used in engineering fields. Based on the theory of Helmholtz resonance, controlling a size of the opening of the neck, a length of the neck, and a volume of an interior of the cavity can control a preset frequency bandwidth of the muffler. The muffler has a great absorption coefficient in the preset frequency bandwidth but nearly has noise absorbing effects outside the frequency bandwidth.

If hoping to use the muffler made based on the theory of Helmholtz resonance to absorb sounds with lower frequencies, a preset frequency of the muffler should be set to a lower frequency. However, because the preset frequency of the muffler is inversely proportional to the volume of the interior of the cavity, the cavity must have a larger volume to set the preset frequency to a lower frequency, and hence the muffler occupies a larger space. So, within limitations of space, the muffler is hard to be configured to absorb lower-frequency sounds.

To sum up, the noise absorbers nowadays are hard to absorb low-frequency sounds within a limited volume, or must have complex circuit designs, therefore needing to be improved.

SUMMARY OF THE INVENTION

The main objective of the present invention is to provide an acoustic metasurface structure to resolve drawbacks that a noise absorber nowadays is hard to absorb low-frequency sounds within a limited volume, or must have complex circuit designs.

The acoustic metasurface structure comprises a main body, an externally-connecting configuration and an inner configuration. The main body has a sound-absorbing hole formed at a surface of the main body. A ratio of a diameter of the main body to a diameter of the sound-absorbing hole is from 9.8:1 to 12.35:1. The externally-connecting configuration is formed inside the main body and has an externally-connecting cavity and an externally-connecting tube, which is disposed inside the externally-connecting cavity. Two ends of the externally-connecting tube are open and in fluid communication with each other. One of the two ends of the externally-connecting tube is connected to the sound-absorbing hole to communicate with an external environment. The other one of the two ends of the externally-connecting tube communicates with the externally-connecting cavity. The inner configuration is formed inside the main body and has an inner cavity and an inner tube, which is disposed inside the inner cavity. Two ends of the inner tube are open and in fluid communication with each other. The inner tube and the externally-connecting tube are spaced apart from each other. One of the two ends of the inner tube communicates with the externally-connecting cavity of the externally-connecting configuration. The inner cavity communicates with the externally-connecting cavity through the inner tube.

The acoustic metasurface structure is designed based on the theory of Helmholtz resonance and is designed with planarization and extending necks. In the externally-connecting configuration, the externally-connecting cavity communicates with the external environment via the externally-connecting tube. In the inner configuration, the inner cavity communicates, via the inner tube, with the externally-connecting cavity of the externally-connecting configuration. Therefore, a series-type structure is formed inside the main body to increase an acoustic impedance of the acoustic metasurface structure, thereby lowering frequencies, which absorption coefficient peaks of the acoustic metasurface structure land on. So, under circumstances of the main body having a limited volume, absorption coefficient of the acoustic metasurface structure toward low frequencies is increased. Besides, the acoustic metasurface structure has a simple configuration, can absorb sounds just by directing the sound-absorbing hole toward sound sources, and is freed from complex circuit designs and from connection to a power source. Hence, the scope of application of the acoustic metasurface structure is enlarged and convenience of use is increased.

DETAILED DESCRIPTION OF THE PREFERRED EMBODIMENT

With reference to FIGS. 1 to 4, a first embodiment of an acoustic metasurface structure in accordance with the present invention comprises a main body 10*a*, an externally-connecting configuration 20 and an inner configuration 30.

Figure 1:
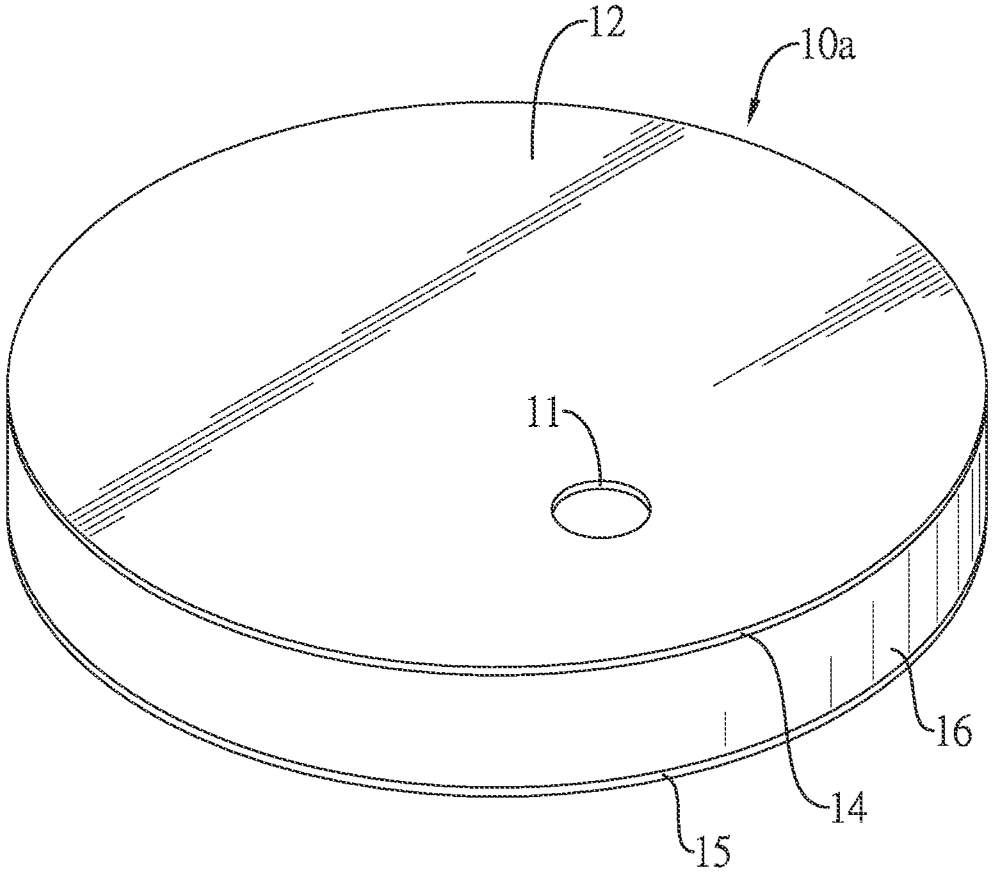
FIG. 1 is a perspective view of a first embodiment of an acoustic metasurface structure in accordance with the present invention.
Figure 2:
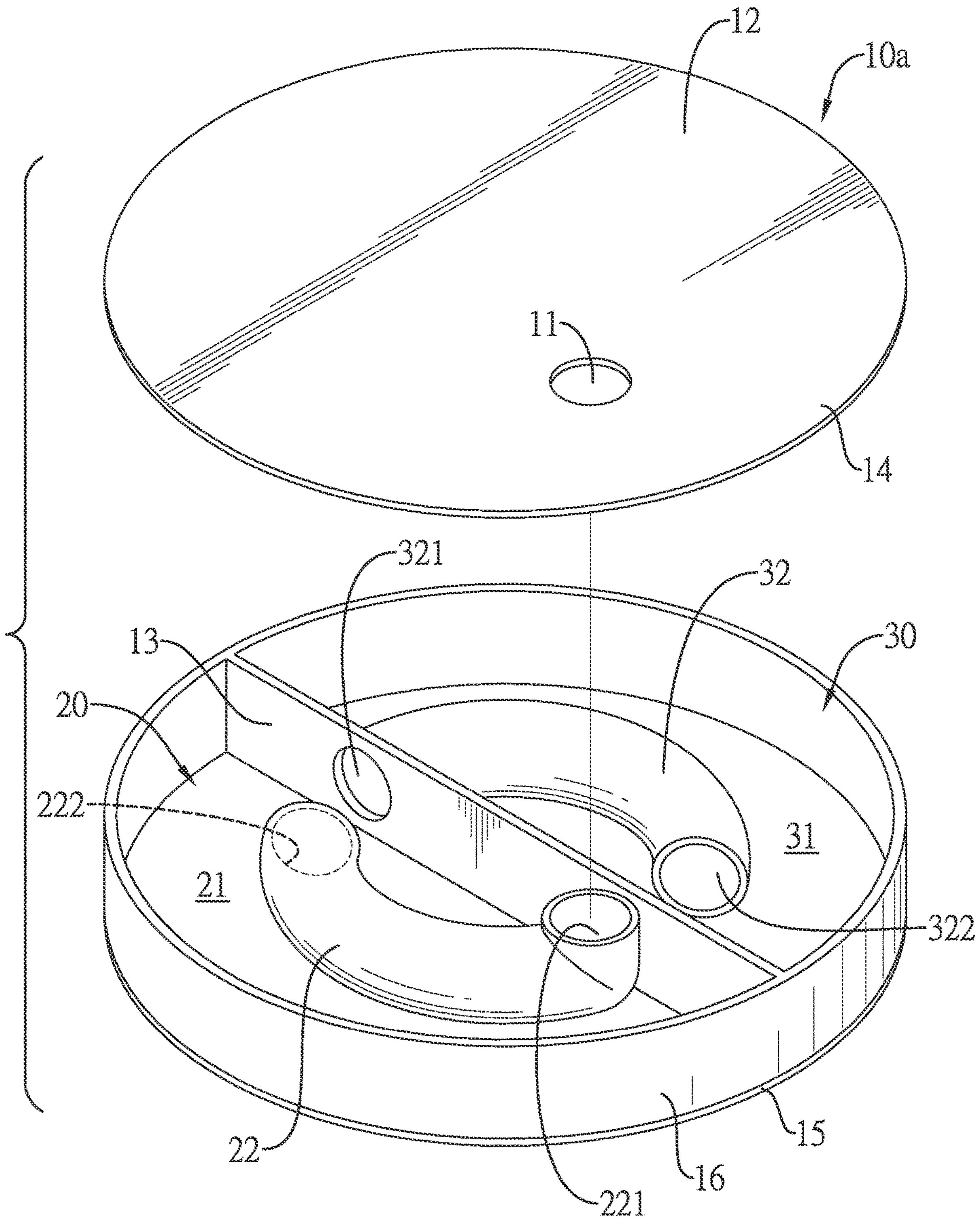
FIG. 2 is an exploded view of the first embodiment of the acoustic metasurface structure in accordance with the present invention.
Figure 3:
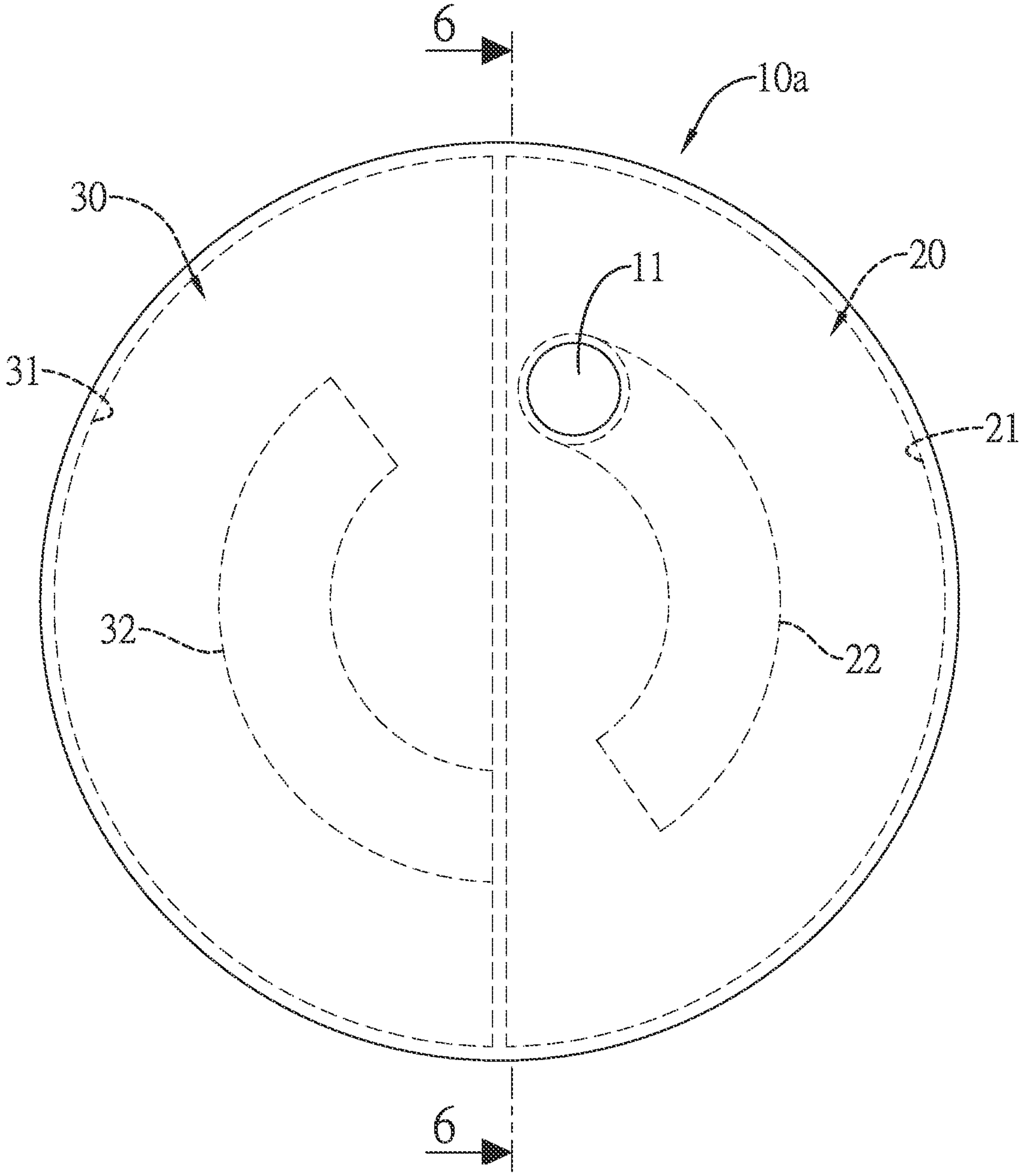
FIG. 3 is a top view of the first embodiment of the acoustic metasurface structure in accordance with the present invention.

As shown in FIGS. 1 to 3, the main body 10*a* to 10*d* has a sound-2 absorbing hole 11, which is formed at a surface of the main body 10*a* to 10*d* and is in fluid communication with an external environment. A ratio of a diameter of the main body 10*a* to 10*d* to a diameter of the sound-absorbing hole 11 is from 9.8:1 to 12.35:1. By designing the ratio of the diameter of the main body 10*a* to 10*d* to the diameter of the sound-absorbing hole 11, frequencies, which absorption coefficient peaks of the acoustic metasurface structure land on, are lower than a frequency of low-frequency sounds. Preferably, the ratio of the diameter of the main body 10*a* to 10*d* to the diameter of the sound-absorbing hole 11 is from 10:1 to 10.87:1. Therefore, the frequencies, which the absorption coefficient peaks of the acoustic metasurface structure land on, are lower than 200 Hz, thereby further lowering the absorption coefficient peaks of the acoustic metasurface structure.

As shown in FIGS. 2 to 5, the externally-connecting configuration 20 is formed inside the main body 10*a* to 10*d* and has an externally-connecting cavity 21 and an externally-connecting tube 22, which is disposed inside the externally-connecting cavity 21. Two ends of the externally-connecting tube 22 are open and in fluid communication. One of the two ends of the externally-connecting tube 22 is connected to the sound-absorbing hole 11 to communicate with the external environment. The other one of the two ends of the externally-connecting tube 22 communicates with the externally-connecting cavity 21 such that the externally-connecting cavity 21 communicates with the external environment. In addition, said one end, which is connected to the sound-absorbing hole 11, of the two ends of the externally-connecting tube 22 is defined as an externally-connecting end 221. Said one end, which communicates with the externally-connecting cavity 21, of the two ends of the externally-connecting tube 22 is defined as an externally-opening end 222.

Figure 4:
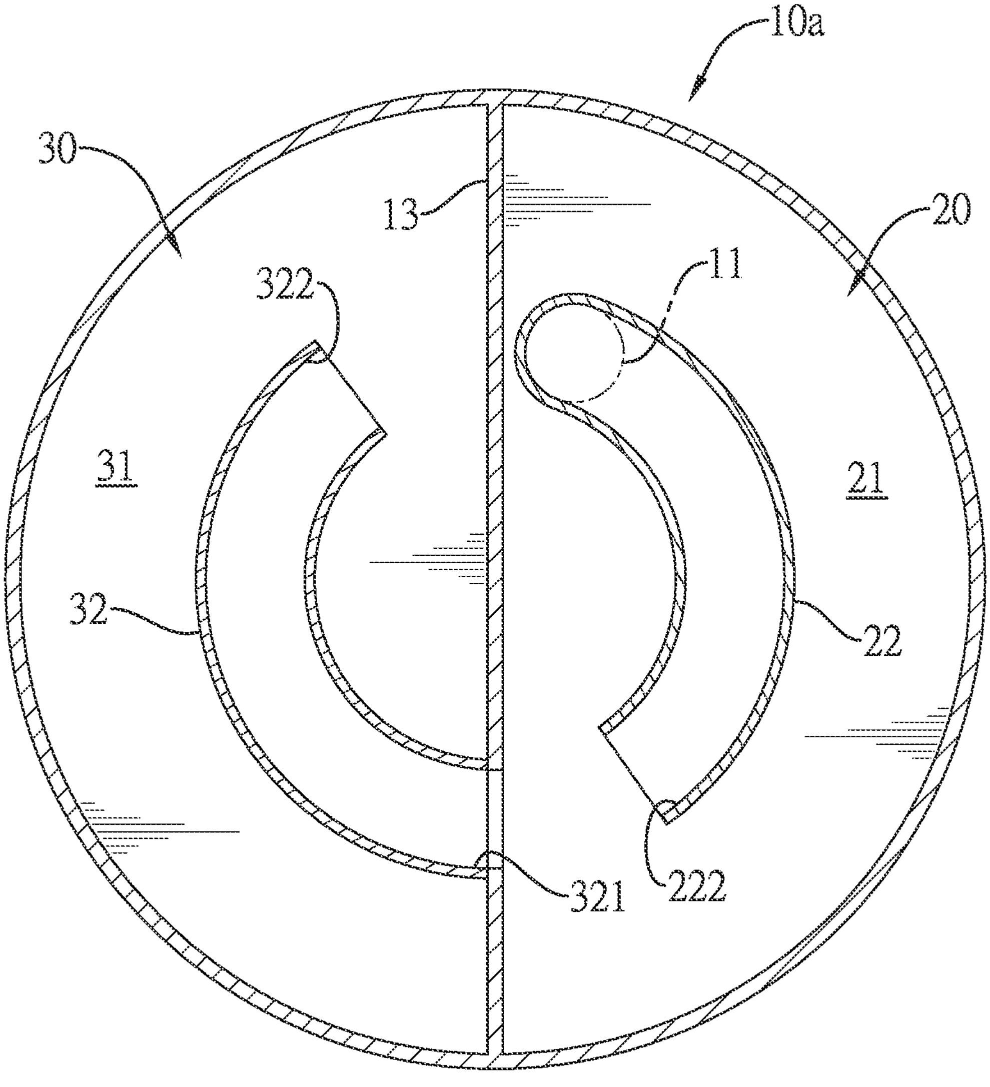
FIG. 4 is a top sectional view of the first embodiment of the acoustic metasurface structure in accordance with the present invention.

As shown in FIGS. 2 to 4, the inner configuration 30 is formed inside the main body 10*a* to 10*d* and has an inner cavity 31 and an inner tube 32, which is disposed inside the inner cavity 31. Two ends of the inner tube 32 are open and in fluid communication. The inner tube 32 and the externally-connecting tube 22 are spaced apart from each other. One of the two ends of the inner tube 32 communicates with the externally-connecting cavity 21 of the externally-connecting configuration 20. The inner cavity 31 communicates with the externally-connecting cavity 21 through the inner tube 32. In addition, said one end, which communicates with the externally-connecting cavity 21, of the two ends of the inner tube 32 is defined as an inner-connecting end 321. The other one, which communicates with the inner cavity 31, of the two ends of the inner tube 32 is defined as an inner-opening end 322.

Besides, the externally-connecting tube 22 and the inner tube 32 are preferably and respectively curved to increase lengths of the externally-connecting tube 22 and the inner tube 32 in a limited space. Apart from that, sections of the externally-connecting tube 22 and the inner tube 32 can be circular, square, polygonal, etc., all of them can make the acoustic metasurface structure sound-absorbing.

The main body 10*a* to 10*d* has a sound-absorbing face 12 and a separating wall 13. The sound-absorbing face 12 is formed at an outer side of the main body 10*a* to 10*d*. The sound-absorbing hole 11 is disposed on the sound-absorbing face 12. The separating wall 13 is disposed inside the main body 10*a* to 10*d* and separates the externally-connecting cavity 21 and the inner cavity 31. One of the two ends of the inner tube 32 is mounted on the separating wall 13 and communicates with the externally-connecting cavity 21.

Figure 5:
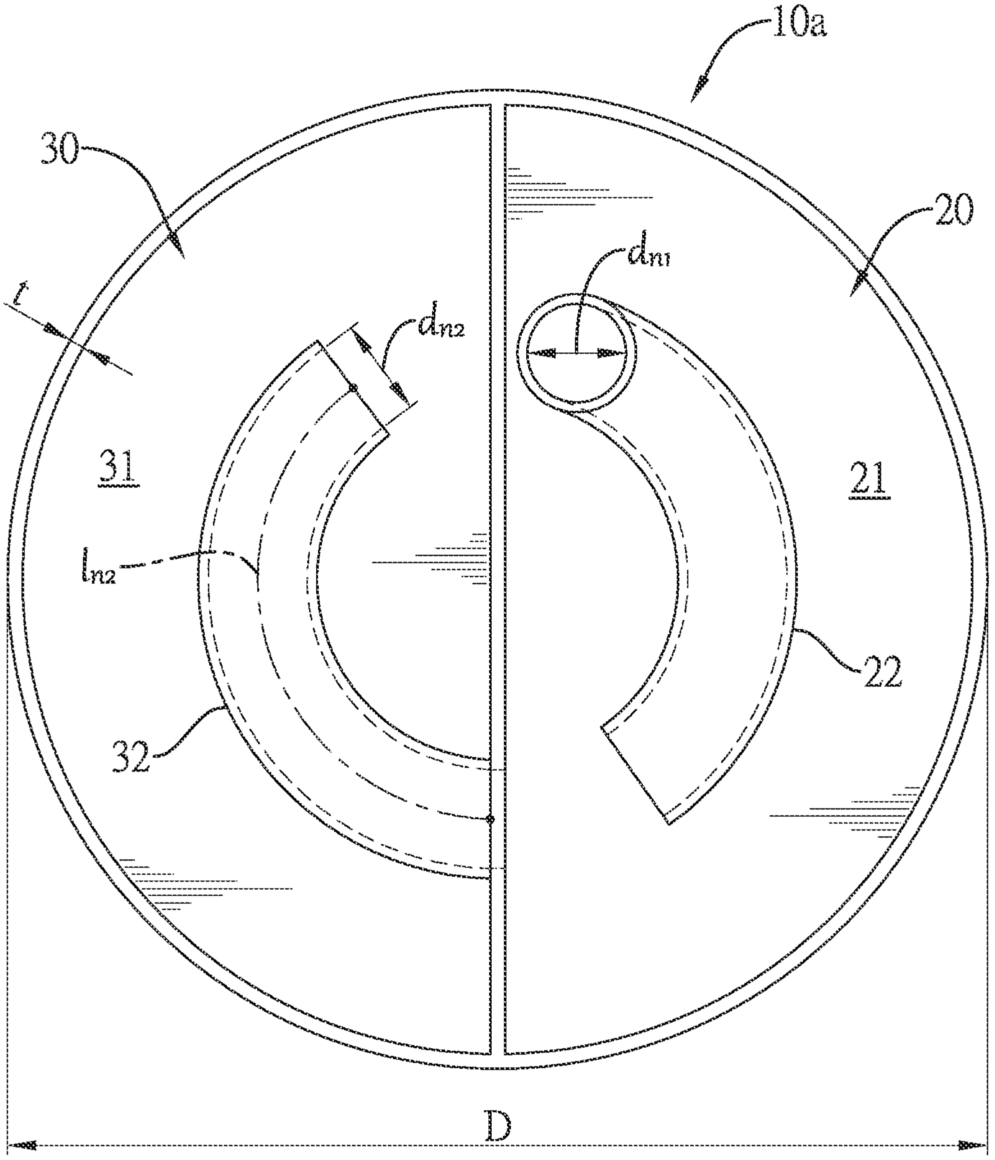
FIG. 5 is a top view of an interior of a main body of the first embodiment of the acoustic metasurface structure in accordance with the present invention.
Figure 6:
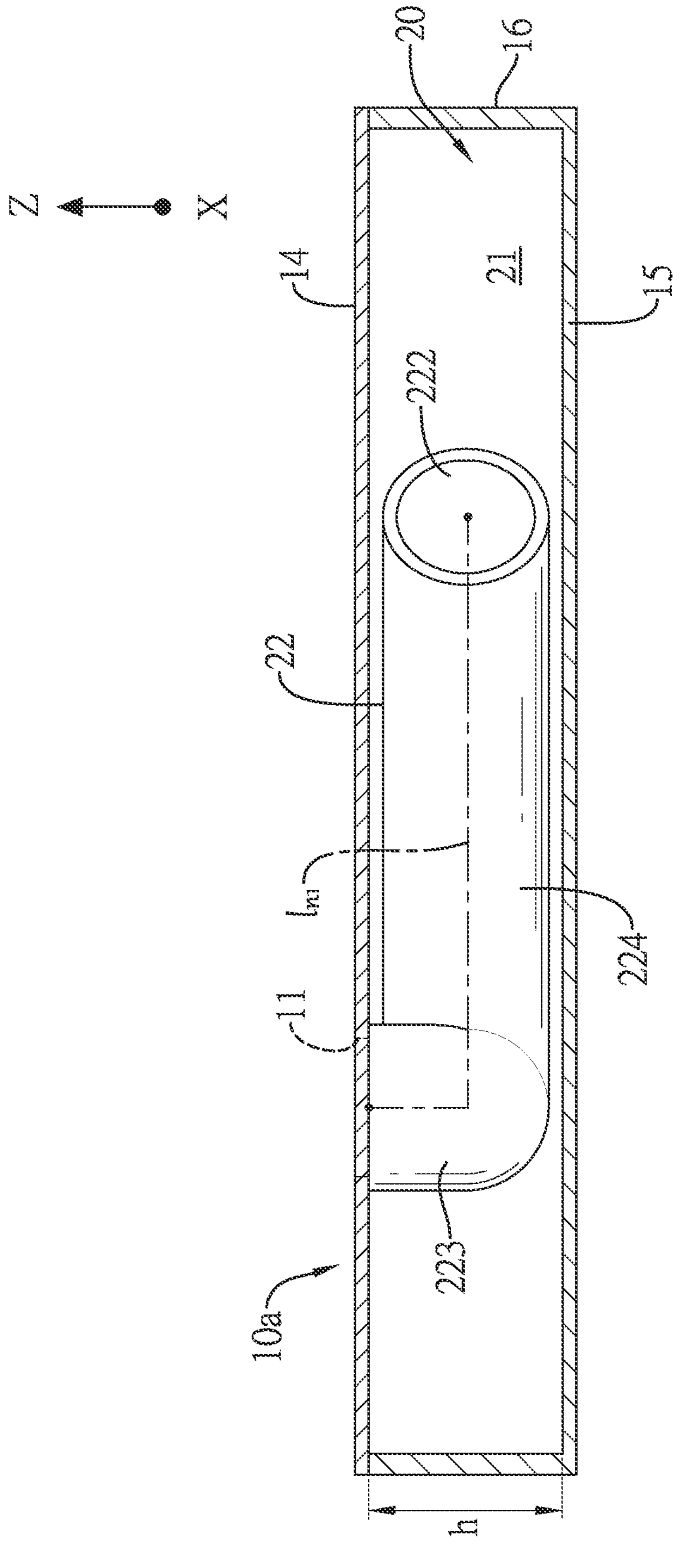
FIG. 6 is a sectional side view across line 6-6 in FIG. 3.

Furthermore, as shown in FIGS. 4 to 6, the externally-connecting cavity 21 and the inner cavity 31 are adjacent to each other on a horizontal reference plane. The externally-connecting tube 22 communicates with the external environment along a Z direction. The inner tube 32 communicates with the externally-connecting cavity 21 along an X direction. The Z direction is perpendicular to the horizontal reference plane. The X direction is parallel to the horizontal reference plane. Besides, the externally-connecting tube 22 comprises an externally-connecting segment 223 and an elongating segment 224. The externally-connecting segment 223 elongates along the Z direction. The elongating segment 224 is connected to the externally-connecting segment 223 and elongates along the horizontal reference plane. With the externally-connecting cavity 21 and the inner cavity 31 adjacent to each other on a horizontal reference plane, the externally-connecting tube 22 being inside the externally-connecting cavity 21, and the inner tube 32 being inside the inner cavity 31, the acoustic metasurface structure is provided in a planarizing configuration, and therefore can be easily installed on walls. Having a flat configuration, the acoustic metasurface structure occupies a small volume and is easy to be stacked up, thereby increasing ease of installing.

Preferably, the main body 10*a* to 10*d* is disc-shaped and the diameter D of the main body 10*a* to 10*d* is on the horizontal reference plane. The externally-connecting cavity 21 has an external-cavity height along the Z direction. The inner cavity 31 has an inner-cavity height along the Z direction. The external-cavity height of the externally-connecting cavity 21 is equal to the inner-cavity height of the inner cavity 31, which means the externally-connecting cavity 21 and the inner cavity 31 share the same cavity height h. The main body 10*a* to 10*d* being disc-shaped is to facilitate experimenting and calculation. A shape of the main body 10*a* to 10*d* can be square or polygonal and is not limited by a preferable embodiment of the present invention. Additionally, the main body 10*a* to 10*d* comprises a top cover 14, a bottom cover 15 and an outer wall 16. The top cover 14 and the bottom cover 15 are respectively mounted at a top side and a bottom side of the outer wall 16. The separating wall 13 is mounted inside the outer wall 16 to separate a space, which is surrounded and formed by the top cover 14, the bottom cover 15 and the outer wall 16 together, into the externally-connecting cavity 21 and the inner cavity 31. One end of the externally-connecting tube 22 is mounted at and embedded in the top cover 14. One end of the inner tube 32 is mounted at and embedded in the separating wall 13.

The acoustic metasurface structure is designed based on a theory of Helmholtz resonance. In the externally-connecting configuration 20, the externally-connecting cavity 21 communicates with the external environment via the externally-connecting tube 22, making the externally-connecting configuration 20 a resonator complying with the theory of Helmholtz resonance. In the inner configuration 30, the inner cavity 31 communicates with the externally-connecting cavity 21 via the inner tube 32, making the inner configuration 30 another resonator complying with the theory of Helmholtz resonance. Said two resonators are connected in series by the inner tube 32, and therefore a series-type structure is formed inside the main body 10*a* to 10*d*.

Specifically, as an analogy between electrical circuits and acoustical systems, an acoustic impedance can be equivalent to an electrical impedance, and thus formulas of series and parallel RLC (resistor, inductor and capacitor) circuits can be applied to calculate the acoustic impedance. So, the acoustic metasurface structure can use the series-type structure to increase the acoustic impedance, thereby lowering a preset frequency of the acoustic metasurface structure and increasing an absorption coefficient of the acoustic metasurface structure toward low frequencies under circumstances of the main body 10*a* to 10*d* having a limited volume. Besides, the acoustic metasurface structure has a simple configuration, can absorb sounds just by directing the sound-absorbing hole 11 of the main body 10*a* to 10*d* toward sound sources, and is freed from complex circuit designs and from connection to a power source. So, the scope of application of the acoustic metasurface structure is enlarged and convenience of use is increased.

Furthermore, by controlling volumes of the externally-connecting cavity 21 and the inner cavity 31, the length and a diameter of the externally-connecting tube 22, and the length and a diameter of the inner tube 32, a total acoustic impedance can be controlled and altered, thereby controlling a preset frequency bandwidth of the acoustic metasurface structure.

Figure 7:
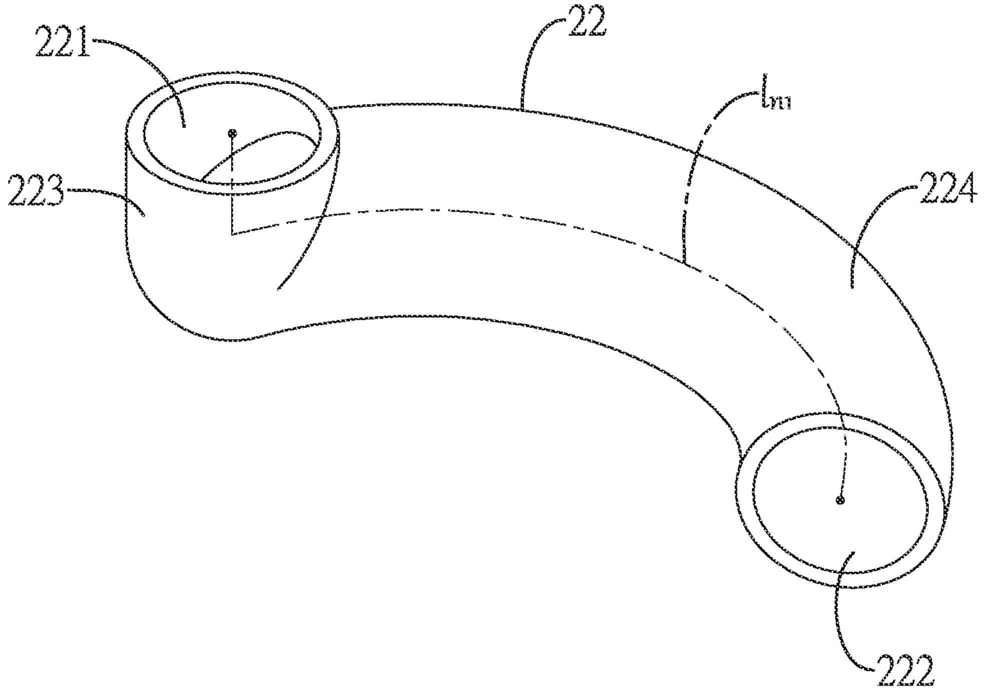
FIG. 7 is a perspective view of an externally-connecting tube of the first embodiment of the acoustic metasurface structure in accordance with the present invention.

Following is a description of a controlling method of the total acoustic impedance of the acoustic metasurface structure. With reference to FIGS. 5 to 7, t is thicknesses of the top cover 14, the bottom cover 15 and the outer wall 16 of the main body 10*a*; D is the diameter of the main body 10*a*; $d_{n1}$ is an inner diameter of the externally-connecting tube 22 and the inner diameter of the externally-connecting tube 22 is equal to the diameter of the sound-absorbing hole 11; $d_{n2}$ is an inner diameter of the inner tube 32; $l_{n1}$ is the length of the externally-connecting tube 22; $l_{n2}$ is the length of the inner tube 32.

Because the externally-connecting tube 22 and the inner tube 32 respectively have a long length and a small diameter relative to the length, a narrow channel is formed inside both of the tubes. Hence thermal-viscous losses in the tubes (which are the externally-connecting tube 22 and the inner tube 32) should be considered. With reference to "Acoustic perfect absorbers via Helmholtz resonators with embedded apertures" (Sibo Huang; Xinsheng Fang; Xu Wang; Badreddine Assouar; Qian Cheng; Yong Li, J Acoust Soc Am 145, 254-262 (2019)) and "Acoustic perfect absorbers via spiral metasurfaces with embedded apertures" (Sibo Huang; Xinsheng Fang; Xu Wang; Badreddine Assouar; Qian Cheng; Yong Li, Appl. Phys. Lett. 113, 233501 (2018)), the acoustic impedance $Z_{ni}$ of a tube can be expressed by the following equation:

$$Z_{ni} = -\rho_0 \times c_0 \times \frac{2 \times j \sin\left(\frac{k_{ci} \times l_{ni}}{2}\right)}{\sqrt{(\gamma - (\gamma - 1) \times \Psi_{hi}) \times \Psi_{v1}}} (i = 1, 2) \quad \text{equation (1)}$$

In the abovementioned equation (1), $Z_{ni}$ is the acoustic impedance of the tube; $\rho_0$ is an air density; $c_0$ is a speed of sound; $k_{ci}$ is a wave number; $l_{ni}$ is the length of the tube; $\gamma$ is a specific heat ratio; $\Psi_{hi}$ and $\Psi_{vi}$ respectively are a thermal function and a viscous function, and they can be respectively expressed by the following equations:

$$\Psi_{hi} = \frac{J_2\left(\frac{k_h \times d_{ni}}{2}\right)}{J_0\left(\frac{k_h \times d_{ni}}{2}\right)}; \quad \Psi_{vi} = \frac{J_2\left(\frac{k_v \times d_{ni}}{2}\right)}{J_0\left(\frac{k_v \times d_{ni}}{2}\right)}$$

In the abovementioned equations, $J_2$ is Bessel functions of the first kind with order two; $J_0$ is Bessel functions of the first kind with order zero; $k_h$ is a thermal wave number; $k_v$ is a viscous wave number; $d_{ni}$ is an inner diameter of the tube.

Additionally, with reference to "Perforated panel absorbers with viscous energy dissipation enhanced by orifice design" (Randeberg R T, PhD thesis submitted to NTNU, 2000, Trondheim), when considering a sound radiation of the tube into a free space, an effective length of the tube is increased. Thus, an end correction of opening ends of tubes (which means the externally-opening end 222 of the externally-connecting tube 22 and the inner-opening end 322 of the inner tube 32) needs to be modified as:

$$\delta_{total} = [1 + (1 - 1.25 \times y)] \times \frac{\delta_{ei}}{2} \quad \text{equation (2)}$$

In the abovementioned equation (2), $\delta_{total}$ is a further tube-length complete end correction; y is a ratio of the diameter of the tube to a radius of the semi-circular cavity. In the preferable embodiment of the present invention, the main body 10*a* to 10*d* is circular, and the externally-connecting cavity 21 and the inner cavity 31 are respectively semi-circular. The ratio y of the diameter of the tube to a radius of the semi-circular cavity can be expressed by the following equation:

$$y = \frac{d_{ni}}{\frac{(D - 3t)}{2}}$$

In the abovementioned equation (2), $\delta_{ei}$ is an initial tube-length end correction. An acoustic mass is affected by air leaving a hole and entering a free space. The initial tube-length end correction $\delta_{ei}$ can be expressed by the following equation:

$$\delta_{ei} = 2 \times \frac{4}{3\pi} \times d_{ni}$$

After considering the end correction of the tube, an acoustic impedance $Z_{Mi}$ contributed by the tube and an opening end of the tube can be expressed by the following equation:

$$Z_{Mi} = Z_{ni} + j\omega \times \rho_0 \times \delta_{total} = -\rho_0 \times c_0 \times \frac{2 \times j \sin\left(\frac{k_{ci} \times l_{ni}}{2}\right)}{\sqrt{(\gamma - (\gamma - 1) \times \Psi_{hi}) \times \Psi_{v1}}} + j\omega \times \rho_0 \times \delta_{total} \quad \text{equation (3)}$$

Among that, $\omega$ is an angular frequency of sounds and can be expressed by the following equation:

$$\omega = 2 \times \pi \times f$$

f is a frequency of sounds.

Moreover, an acoustic impedance $Z_{Ci}$ contributed by the cavity can be expressed by the following equation:

$$Z_{Ci} = \frac{p}{v} = \frac{p}{U/S_{ni}} = -\frac{jS_{ni} \times \rho_0 \times c_0^2}{\omega \times V_i} \quad \text{equation (4)}$$

Wherein p is an acoustic pressure; v is a particle velocity of the air; U is a volume velocity of the air through the semi-circular cavity; $S_{ni}$ is a surface area of the tube; $V_i$ is a volume of the cavity.

In the abovementioned equation (4), the surface area $S_{ni}$ of the tube can be expressed by the following equation:

$$S_{ni} = \pi \times \left(\frac{d_{ni}}{2}\right)^2$$

After that, with reference to "Theory and design of microperforated panel sound-absorbing constructions" (Dah-You Maa, Sci. Sin. 18, 55-71 (1975)) and "On the theory and design of acoustic resonators" (Uno Ingard, J. Acoust. Soc. Am. 25, 1037-61 (1953)), considering a friction loss around boundaries of a surface inlet of connecting ends of the tubes, an end correction of an acoustic resistance $Z_{Ri}$ contributed by the connecting ends of the tubes (which means the externally-connecting end 221 of the externally-connecting tube 22 and the inner-connecting end 321 of the inner tube 32) can be expressed by the following equation:

$$Z_{Ri} = 2 \times \sqrt{2 \times \omega \times \rho_0 \times \eta} \quad \text{equation (5)}$$

Wherein $\eta$ is a dynamic viscosity.

Figure 8:
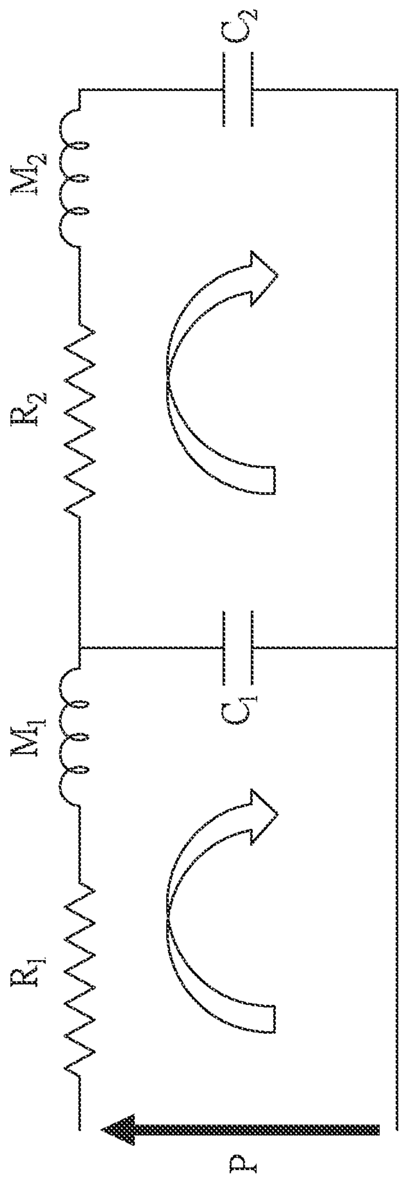
FIG. 8 shows an equivalent circuit to an acoustic impedance of the first embodiment of the acoustic metasurface structure in accordance with the present invention.

As mentioned above, an acoustic impedance can be equivalent to an electrical impedance, and thus the formulas of series and parallel RLC circuits can be applied to calculate the acoustic impedance. A first embodiment of the acoustic metasurface structure in accordance with the present invention is formed by the externally-connecting configuration 20 and the inner configuration 30 connected in series with each other. FIG. 8 is an equivalent circuit of the acoustic impedance of this embodiment. Hence, a total acoustic impedance $Z_{total}$ of the acoustic metasurface structure can be expressed by the following equation:

$$Z_{total} = \xi \times \left( Z_{R1} + Z_{M1} + \frac{1}{\frac{1}{Z_{C1}} + \frac{1}{Z_{R2} + Z_{M2} + Z_{C2}}} \right) \quad \text{equation (6)}$$

In the abovementioned equation (6), ξ is a ratio of a surface area of the sound-absorbing face 12 of the main body 10*a* to 10*d* to an area of the sound-absorbing hole 11, and can be expressed by the following equation:

$$\xi = \frac{A}{S_{ni}}$$

Among that, A is the surface area of the sound-absorbing face 12 of the main body the main body 10*a* to 10*d* and can be expressed by the following equation:

$$A = \pi \times \left(\frac{D}{2}\right)^2$$

Besides, the absorption coefficient α can be expressed by the following equation:

$$\alpha = 1 - \left| \frac{Z_{total} - \rho_0 \times c_0}{Z_{total} + \rho_0 \times c_0} \right|^2 \quad \text{equation (7)}$$

In the first embodiment of the present invention, substituting i=1 into the abovementioned equations represents the externally-connecting configuration 20, comprising the externally-connecting tube 22 and the externally-connecting cavity 21, and substituting i=2 into the abovementioned equations represents the inner configuration 30, comprising the inner tube 32 and the inner cavity 31. Substituting i=1 and 2 into the equation (3), equation (4) and equation (5) can obtain the acoustic impedances $Z_{M1}$, $Z_{M2}$, $Z_{c1}$, $Z_{c2}$ and the acoustic resistances $Z_{R1}$, $Z_{R2}$, then substituting the acoustic impedances $Z_{M1}$, $Z_{M2}$, $Z_{c1}$, $Z_{c2}$ and the acoustic resistances $Z_{R1}$, $Z_{R2}$ into the equation (6) can obtain a relationship between the total acoustic impedance $Z_{total}$ and the frequency f of sounds. Substituting the total acoustic impedance $Z_{total}$ into the equation (7) can obtain the absorption coefficient α. The total acoustic impedance $Z_{total}$ of the acoustic metasurface structure relates to the thicknesses t of the top cover 14, the bottom cover 15, and the outer wall 16 of the main body 10*a*, to the diameter D of the main body 10*a*, the inner diameter $d_{n1}$ of the externally-connecting tube 22, the inner diameter $d_{n2}$ of the inner tube 32, the length $l_{n1}$ of the externally-connecting tube 22, and to the length $l_{n2}$ of the inner tube 32. Therefore, altering structural dimensions of the acoustic metasurface structure can make the acoustic metasurface structure have a preset frequency with a better absorption coefficient.

Figure 9A:
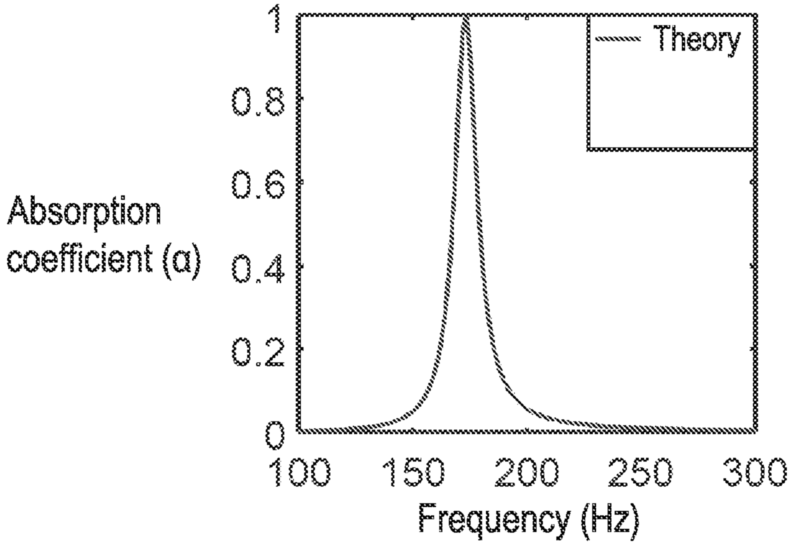
FIG. 9A is a diagram of theoretical results of the first embodiment of the acoustic metasurface structure in accordance with the present invention.
Figure 9B:
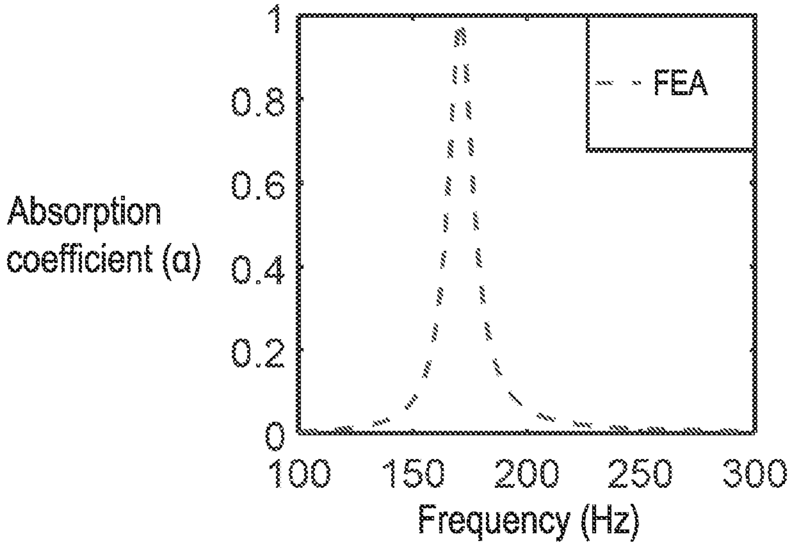
FIG. 9B is a diagram of Finite Element Analysis (FEA) results of the first embodiment of the acoustic metasurface structure in accordance with the present invention.
Figure 9C:
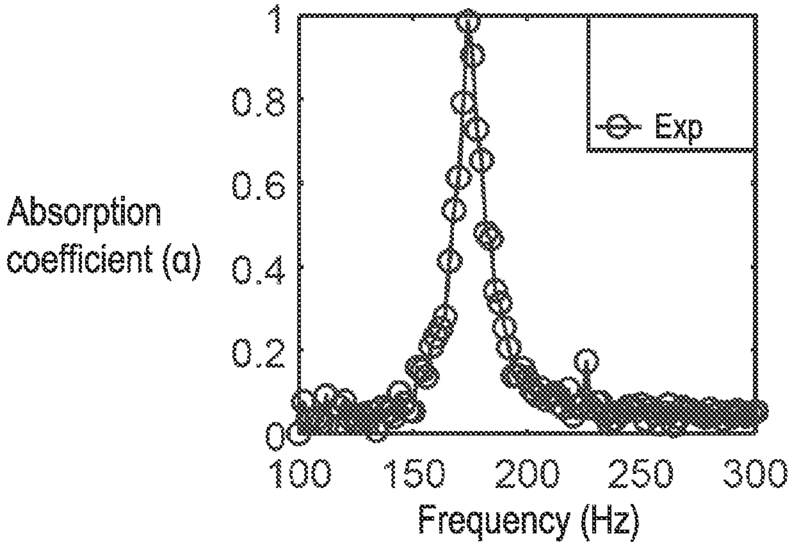
FIG. 9C is a diagram of experimenting results of the first embodiment of the acoustic metasurface structure in accordance with the present invention.

With reference to FIGS. 5 to 7, taking the first embodiment of the present invention as an example, the structural dimensions of the acoustic metasurface structure are set as follows: the diameter D of the main body 10*a* is 100 mm; the inner diameter $d_{n1}$ of the externally-connecting tube 22 is 10 mm; the inner diameter $d_{n2}$ of the inner tube 32 is 10 mm; the length $l_{n1}$ of the externally-connecting tube 22 is 61.2 mm; the length $l_{n2}$ of the inner tube 32 is 61.2 mm; the thicknesses t of the separating wall 13, the top cover 14, the bottom cover 15, and the outer wall 16 of the main body 10*a* are 1.5 mm; the cavity heights h of the externally-connecting cavity 21 and the inner cavity 31 are 14 mm. With reference to FIGS. 9A to 9C, diagrams show results of frequency (horizontal axis) related to absorption coefficient (vertical axis) obtained from calculating, Finite Element Analysis (FEA) or experimenting on the acoustic metasurface structure set with the abovementioned structural dimensions. With reference to FIG. 9A, theoretical results obtained from using the abovementioned equations to calculate with the structural dimensions are shown. FIG. 9B shows FEA results obtained by using COMSOL Multiphysics to build a finite element model in accordance with the acoustic metasurface structure and using finite element method to analyze. With reference to FIG. 9C, experimenting results obtained from applying the acoustic metasurface structure to an impedance tube (SW422, BSWA Technology) is shown. As shown in those diagrams, a frequency, which the absorption coefficient peak of this embodiment lands on, is 173.2 Hz and the absorption coefficient is 0.99. So, it is obvious that the present invention indeed can absorb low-frequency sounds. Besides, a frequency bandwidth, which has the absorption coefficient higher than 0.5, is 13 Hz.

Figure 10:
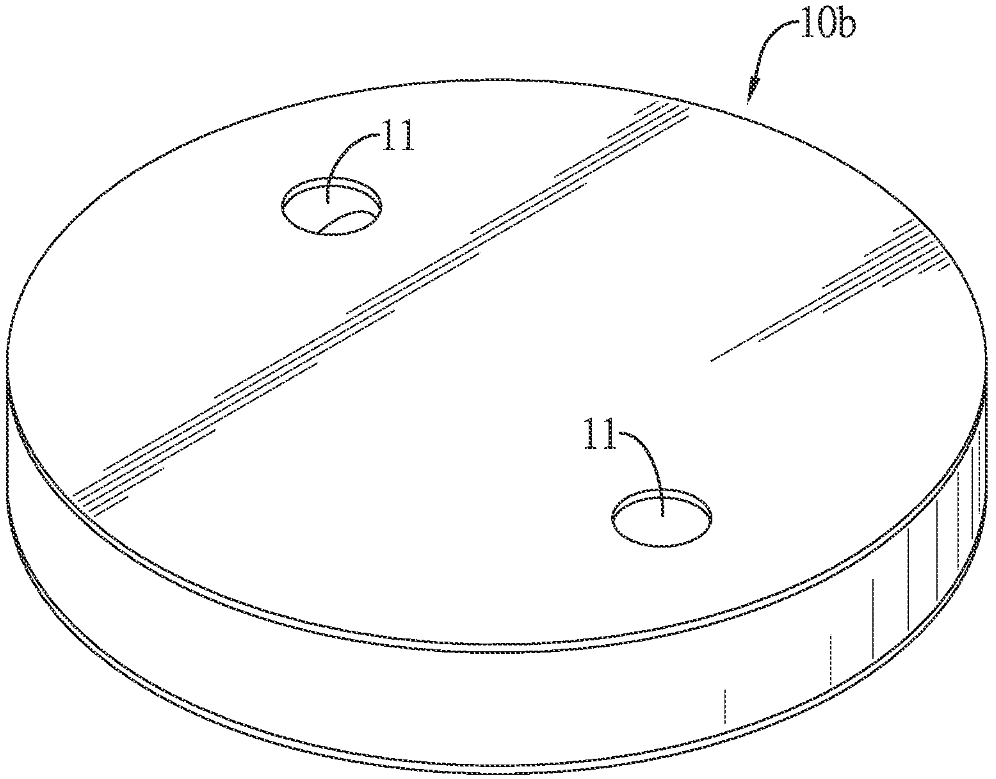
FIG. 10 is a perspective view of a second embodiment of the acoustic metasurface structure in accordance with the present invention.
Figure 11:
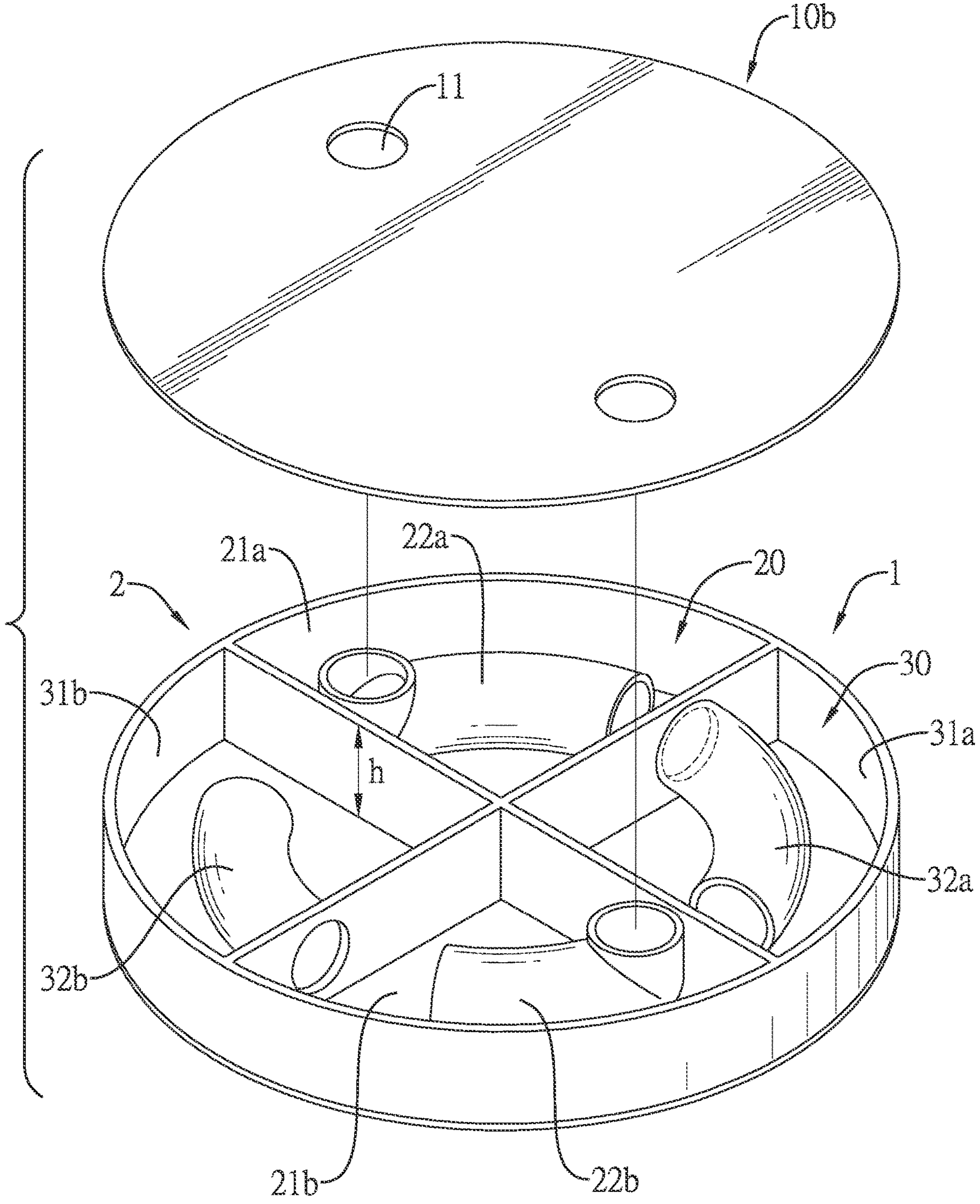
FIG. 11 is an exploded view of the second embodiment of the acoustic metasurface structure in accordance with the present invention.
Figure 12:
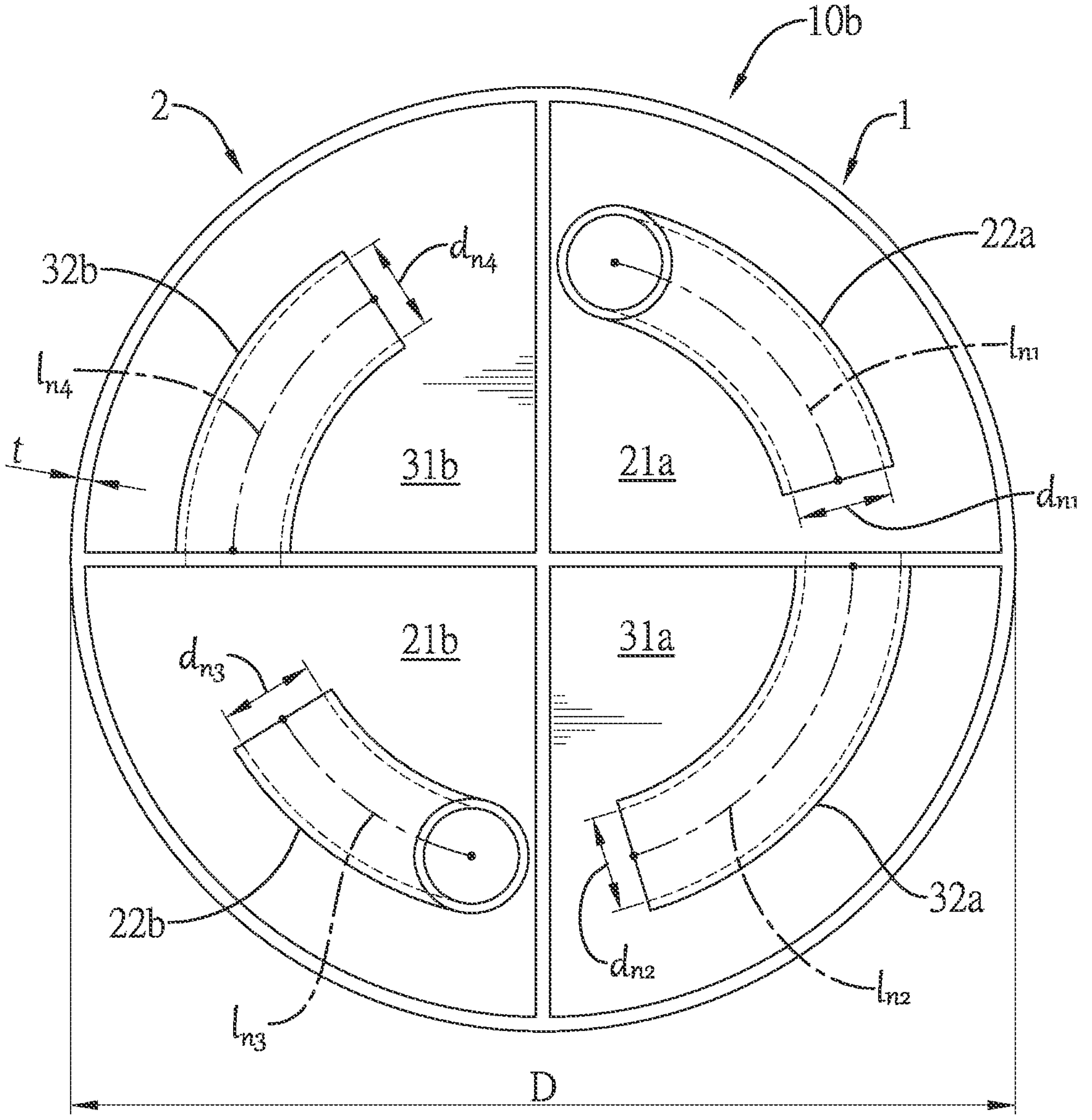
FIG. 12 is a top view of the interior of the main body of the second embodiment of the acoustic metasurface structure in accordance with the present invention.

With reference to FIGS. 10 to 12, in a second embodiment of the present invention, two said acoustic metasurface structures are set abreast and the sound-absorbing hole 11 of said two acoustic metasurface structure faces the same side. Said two acoustic metasurface structure are respectively defined as a first structure 1 and a second structure 2. The externally-connecting cavity 21 of the first structure is defined as a first externally-connecting cavity 21*a*. The inner cavity 31 of the first structure is defined as a first inner cavity 31*a*. The externally-connecting tube 22 of the first structure is defined as a first externally-connecting tube 22*a*. The inner tube 32 of the first structure is defined as a first inner tube 32*a*. The externally-connecting cavity 21 of the second structure is defined as a second externally-connecting cavity 21*b*. The inner cavity 31 of the second structure is defined as a second inner cavity 31*b*. The externally-connecting tube 22 of the second structure is defined as a second externally-connecting tube 22*b*. The inner tube 32 of the second structure is defined as a second inner tube 32*b*.

The second embodiment of the present invention can be viewed as a parallel structure formed by setting the first structure and the second structure abreast, so can be equivalent to parallel circuits equation. Therefore, a total acoustic impedance $Z_{total}$ of this embodiment can be expressed by the following equation:

$$Z_{total} = \frac{1}{\xi} \times \left( \frac{1}{Z_{R1} + Z_{M1} + \frac{1}{\frac{1}{Z_{C1}} + \frac{1}{Z_{R2} + Z_{M2} + Z_{C2}}}} + \frac{1}{Z_{R3} + Z_{M3} + \frac{1}{\frac{1}{Z_{C3}} + \frac{1}{Z_{R4} + Z_{M4} + Z_{C4}}}} \right) \quad \text{equation (8)}$$

In the second embodiment of the present invention, i=1 represents the first externally-connecting cavity 21*a* and the first externally-connecting tube 22*a*; i=2 represents the first inner cavity 31*a* and the first inner tube 32*a*; i=3 represents the second externally-connecting cavity 21*b* and the second externally-connecting tube 22*b*; i=4 represents the second inner cavity 31*b* and the second inner tube 32*b*. Substituting i=1, 2, 3, 4 into the equation (3), equation (4) and equation (5) and then into the equation (8), a relationship between the total acoustic impedance $Z_{total}$ of the second embodiment of the present invention and the frequency f of sounds can be obtained. Substituting the total acoustic impedance $Z_{total}$ into the equation (7) can obtain an absorption coefficient α of this embodiment.

Figure 13A:
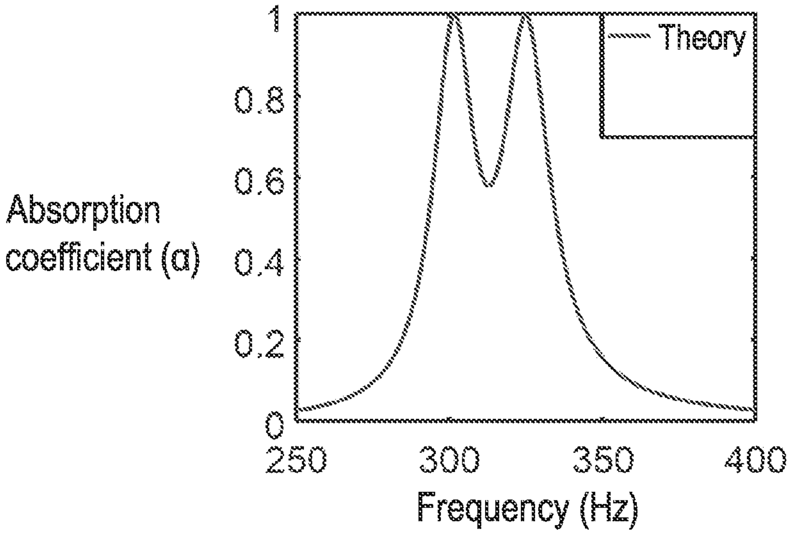
FIG. 13A is a diagram of theoretical results of the second embodiment of the acoustic metasurface structure in accordance with the present invention.
Figure 13B:
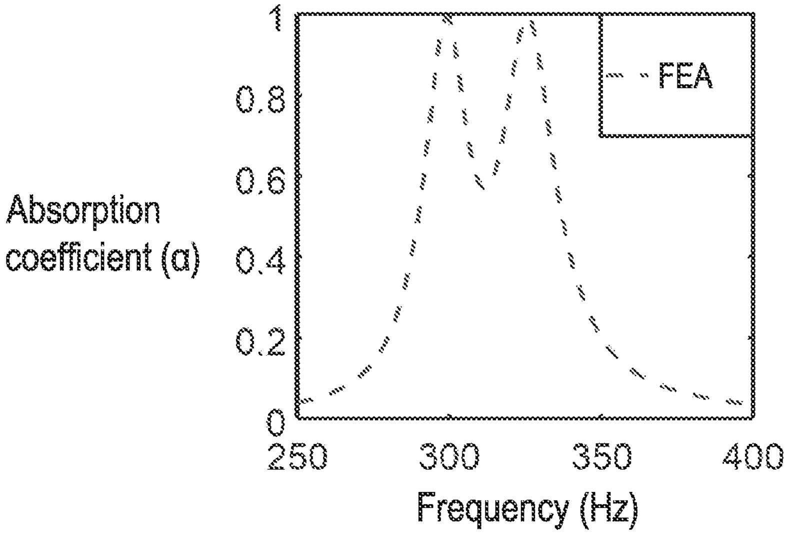
FIG. 13B is a diagram of FEA results of the second embodiment of the acoustic metasurface structure in accordance with the present invention.
Figure 13C:
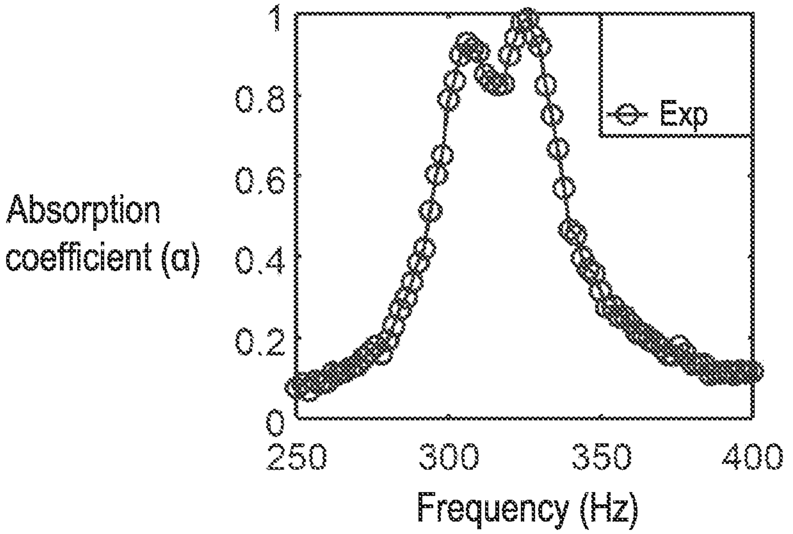
FIG. 13C is a diagram of experimenting results of the second embodiment of the acoustic metasurface structure in accordance with the present invention.

Taking the second embodiment of the present invention as an example, the structural dimensions of the acoustic metasurface structure are set as follows: the diameter D of the main body 10*b* is 100 mm; the inner diameter $d_{n1}$ of the first externally-connecting tube 22*a*, the inner diameter $d_{n2}$ of the first inner tube 32*a*, the inner diameter $d_{n3}$ of the second externally-connecting tube 22*b*, the inner diameter $d_{n4}$ of the second inner tube 32*b* are all 10 mm respectively; both the length $l_{n1}$ of the first externally-connecting tube 22*a* and the length $l_{n2}$ of the first inner tube 32*a* are 42.3 mm; both the length $l_{n3}$ of the second externally-connecting tube 22*b* and the length $l_{n4}$ of the second inner tube 32*b* are 33 mm; the thicknesses t of the separating wall 13, the top cover 14, the bottom cover 15, and the outer wall 16 of the main body 10*b* are 1.5 mm; the cavity heights h of the externally-connecting cavity 21 and the inner cavity 31 are 14 mm. With reference to FIGS. 13A to 13C, diagrams show results of frequency (horizontal axis) related to absorption coefficient (vertical axis) obtained from calculating, FEA or experimenting on the acoustic metasurface structure, set with the abovementioned structural dimensions. With reference to FIG. 13A, theoretical results obtained from using the abovementioned equations to calculate with the structural dimensions are shown. FIG. 13B shows FEA results, which are obtained by using COMSOL Multiphysics to build a finite element model in accordance with the acoustic metasurface structure and using finite element method to analyze. With reference to FIG. 13C, experimenting results obtained from applying the acoustic metasurface structure to an impedance tube (SW422, BSWA Technology) is shown. As shown in those diagrams, this embodiment has two absorption coefficient peaks, one of the two peaks lands on 306 Hz with an absorption coefficient being 0.93, and the other one of the two peaks lands on 326 Hz with an absorption coefficient being 0.99. A frequency bandwidth, which has the absorption coefficient higher than 0.5, is 45 Hz.

Among that, both of the length $l_{n1}$ of the first externally-connecting tube 22*a* and the length $l_{n2}$ of the first inner tube 32*a* of the first structure are larger than both of the length $l_{n3}$ of the second externally-connecting tube 22*b* and the length $l_{n4}$ of the second inner tube 32*b* of the second structure, so an absorption coefficient peak of the first structure lands on a relatively low frequency while an absorption coefficient peak of the second structure lands on a relatively high frequency. The frequencies, which the two absorption coefficient peaks of the two structures land on, are spaced, therefore increasing the frequency bandwidth, which has the absorption coefficient higher than 0.5, of this embodiment. Besides, if arranging multiple of the first embodiment of the present invention abreast and setting said multiple first embodiments to respectively have the externally-connecting tube 22 and the inner tube 32 with different lengths, said multiple first embodiments will have absorption coefficient peaks landing on different frequencies, therefore still increasing the frequency bandwidth having the absorption coefficient higher than 0.5.

Figure 14:
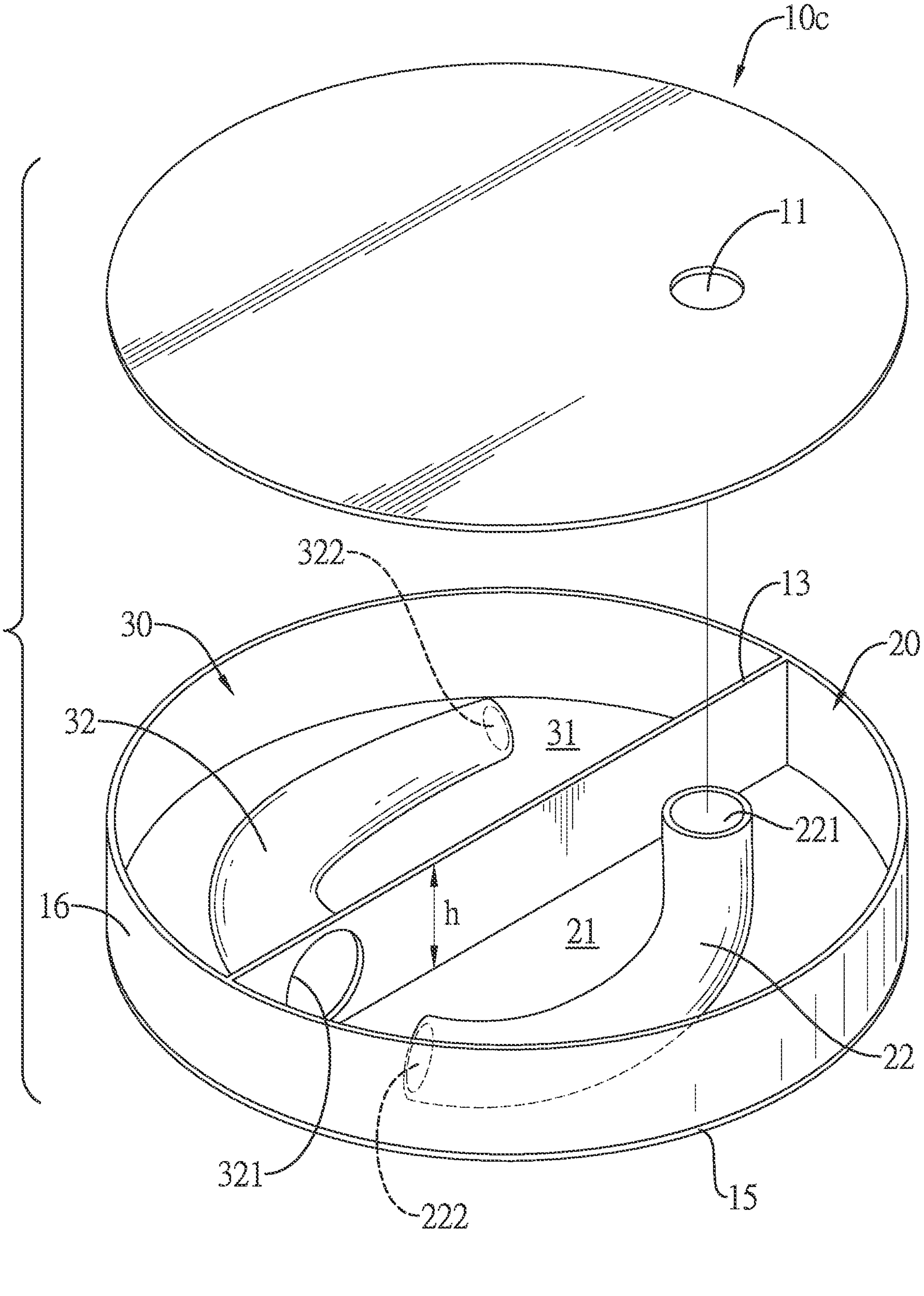
FIG. 14 is an exploded view of a third embodiment of the acoustic metasurface structure in accordance with the present invention.
Figure 15:
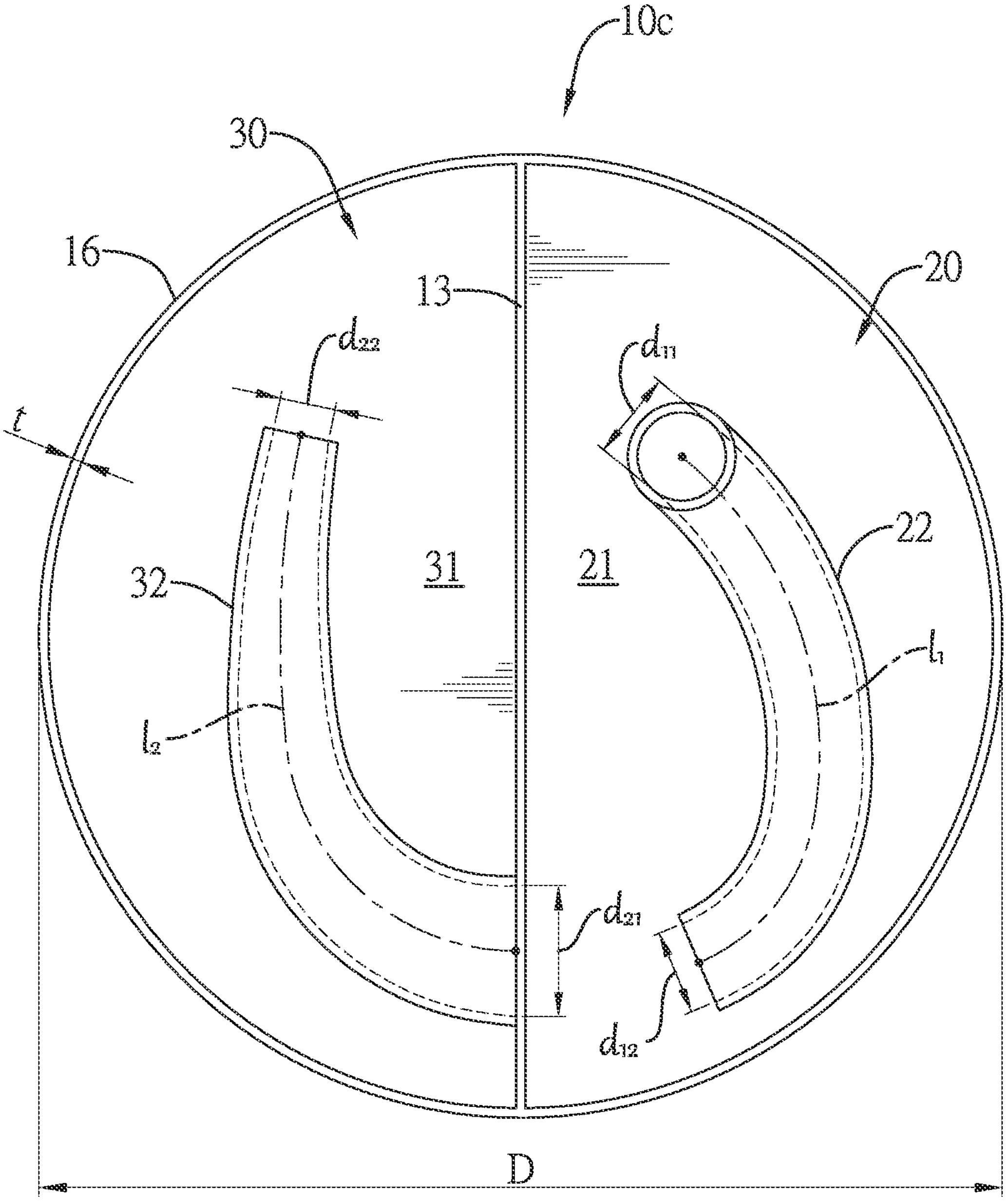
FIG. 15 is a top view of the interior of the main body of the third embodiment of the acoustic metasurface structure in accordance with the present invention.

With reference to FIGS. 14 to 15, in a third embodiment of the present invention, the inner diameters of the externally-connecting tube 22 change gradually from the externally-connecting end 221 to the externally-opening end 222. The inner diameters of the inner tube 32 change gradually from the inner-connecting end 321 to the inner-opening end 322.

In this embodiment, with reference to "Perfect acoustic absorption of Helmholtz resonators via tapered necks" (Song C; Huang S; Zhou Z; Zhang J; Jia B; Zhou C; Li Y; Pan Y, Appl Phys Express 2022; 15: 084006), an acoustic impedance $Z_{e,p}$ of the tube can be expressed by the following equation:

$$Z_{e,p} = \frac{A\,(l_{a,p} - b)}{V_{t,p}} \times (R_{e1,p} + R_{e2,p} + X_{e1,p} + x_{e2,p}) + j\rho_0 \times \omega \times \int_0^{l_{a,p}} \frac{1}{\sigma_{x,p}} \times \left[1 - \frac{2}{k_{x,p}\sqrt{-j}} \times \frac{J_1 \times \left(k_{x,p}\sqrt{-j}\right)}{J_0 \times \left(k_{x,p}\sqrt{-j}\right)}\right]^{-1} dx \quad \text{equation (9)}$$

Wherein substituting p=1 into the abovementioned equations represents the externally-connecting configuration 20, comprising the externally-connecting tube 22 and the externally-connecting cavity 21. Substituting p=2 into the abovementioned equations represents the inner configuration 30, comprising the inner tube 32 and the inner cavity 31. e1 is the connecting end of the tube and e2 is the opening end of the tube. A is a total sectional area of the main body 10*c*. $l_{a,p}$ is the length of the tube. b is a thickness of the top cover 14. $V_{t,p}$ is a volume of the tube. $R_{e1,p}$ is a resistance end correction of the connecting end of the tube, and $R_{e2,p}$ is a resistance end correction of the opening end of the tube. $X_{e1,p}$ is a reactance end correction of the connecting end of the tube, and $X_{e2,p}$ is a reactance end correction of the opening end of the tube. $\sigma_{x,p}$ is a porosity, which means a ratio of a changing sectional area of the tube to the total sectional area of the main body 10*c*. $k_{x,p}$ is a perforation constant. $J_0$ is Bessel functions of the first kind with order zero. $J_1$ is Bessel functions of the first kind with order one. x represents a length from the opening end along the tube.

In addition, the resistance end corrections $R_{e1,p}$ and $R_{e2,p}$ of the connecting end and the opening end of the tube can be expressed by the following equation:

$$R_{e1,p} = 1.39 \times \frac{(2 \times \omega \times \rho_0 \times \eta)^{0.5}}{2} + 4.56 \times \frac{\eta}{d_{a1,p}}$$

Wherein $d_{a1,p}$ is an inner diameter of the connecting end of the tube and $d_{a2,p}$ is an inner diameter of the opening end of the tube. Besides, the resistance end correction $R_{e2,p}$ can be obtained by replacing $d_{a1,p}$ in the abovementioned equation with $d_{a2,p}$.

Further to explain, in this embodiment, as shown in FIG. 15, $d_{11}$ of the externally-connecting tube 22 represents $d_{a1,1}$ and $d_{12}$ of the externally-connecting tube 22 represents $d_{a2,1}$; $d_{21}$ of the inner tube 32 represents $d_{a1,2}$ and $d_{22}$ of the inner tube 32 represents $d_{a2,2}$.

Besides, the reactance end corrections $X_{e1,p}$ and $X_{e2,p}$ of the connecting end and the opening end of the tube can be expressed by the following equation:

$$X_{e1,p} = j\left[0.42 \times \rho_0 \times \omega \times d_{a1,p} + 1.39 \times \frac{(2 \times \omega \times \rho_0 \times \eta)^{0.5}}{2}\right]$$

Additionally, the reactance end correction $X_{e2,p}$ can be obtained by replacing $d_{a1,p}$ in the abovementioned equation with $d_{a2,p}$.

Further, the porosity $\sigma_{x,p}$ can be expressed by the following equation:

$$\sigma_{x,p} = \frac{\pi}{A} \times \left[\frac{1}{2} \times \left(d_{a2,p} + \frac{(d_{a1,p} - d_{a2,p}) \times x}{l_{a,p}}\right)\right]^2$$

In addition, the perforation constant $k_{x,p}$ can be expressed by the following equation:

$$k_{x,p} = \left[d_{a2,p} + \frac{(d_{a1,p} - d_{a2,p}) \times x}{l_{a,p}}\right] \times \sqrt{\frac{\omega \times \rho_0}{\eta}} \div 2 \circ$$

Furthermore, an acoustic impedance $Z_{C,p}$ of the cavity can be expressed by the following equation:

$$Z_{C,p} = \frac{A \times (l_{a,p} - b)}{V_{t,p}} \times \left(-j\frac{S_{a,p} \times \rho_0 \times c_0^2}{\omega \times V_{c,p}}\right) \quad \text{equation (10)}$$

Wherein $S_{a,p}$ is an average sectional area of the connecting end and the opening end of the tube. $V_{c,p}$ is the volume of the cavity.

The third embodiment of the present invention is still a series-type structure, so a total acoustic impedance $Z_{series}$ of the acoustic metasurface structure can be expressed by the following equation:

$$Z_{series} = Z_{e,1} + \frac{1}{\frac{1}{Z_{C,1}} + \frac{1}{Z_{e,2} + Z_{C,2}}} \quad \text{equation (11)}$$

In the third embodiment of the present invention, substituting p=1 into the abovementioned equations represents the externally-connecting configuration 20, comprising the externally-connecting tube 22 and the externally-connecting cavity 21. Substituting p=2 into the abovementioned equations represents the inner configuration 30, comprising the inner tube 32 and the inner cavity 31. e1 is the connecting end of the tube and e2 is the opening end of the tube. By substituting p=1 and 2 into equation (9) and equation (10), and then substituting obtained answers into equation (11), a relationship between the total acoustic impedance $Z_{series}$ of the third embodiment of the present invention and the frequency f of sounds can be obtained. Substituting the total acoustic impedance $Z_{series}$ into the equation (7) can obtain an absorption coefficient α of this embodiment.

Figure 16A:
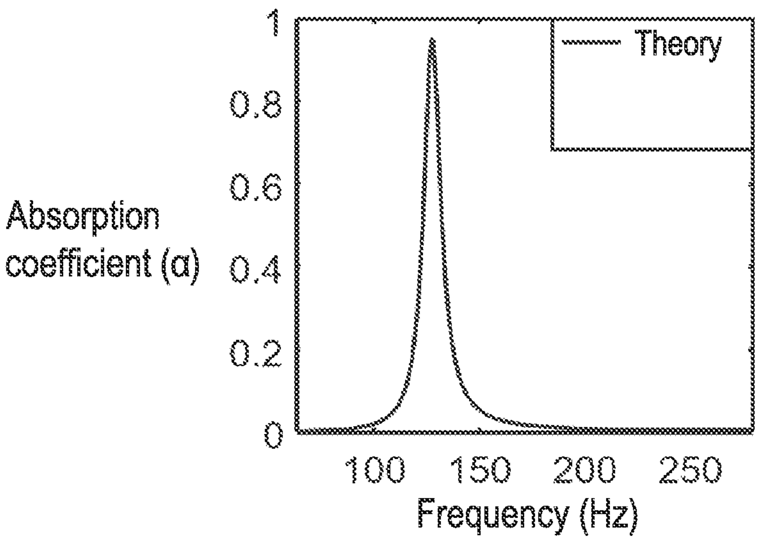
FIG. 16A is a diagram of theoretical results of the third embodiment of the acoustic metasurface structure in accordance with the present invention.
Figure 16B:
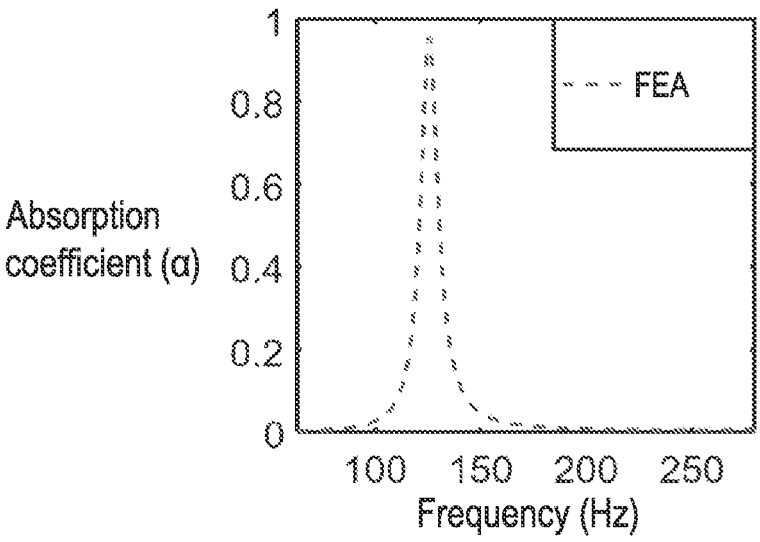
FIG. 16B is a diagram of FEA results of the third embodiment of the acoustic metasurface structure in accordance with the present invention.
Figure 16C:
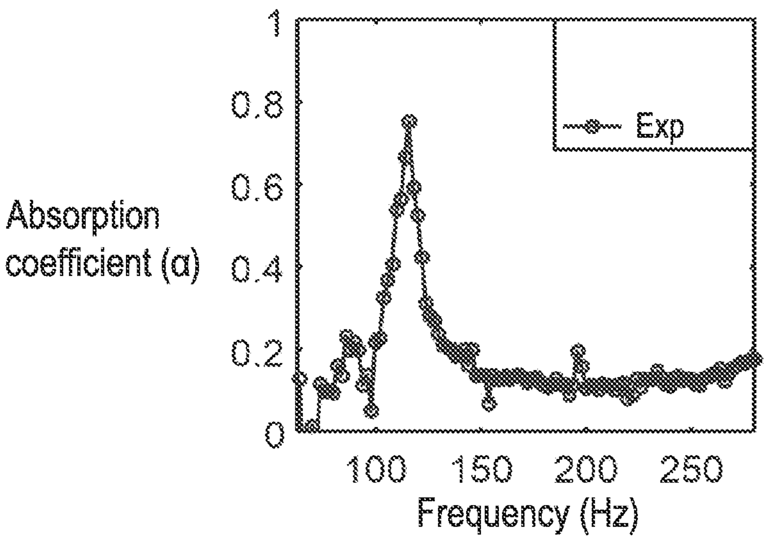
FIG. 16C is a diagram of experimenting results of the third embodiment of the acoustic metasurface structure in accordance with the present invention.
Figure 17:
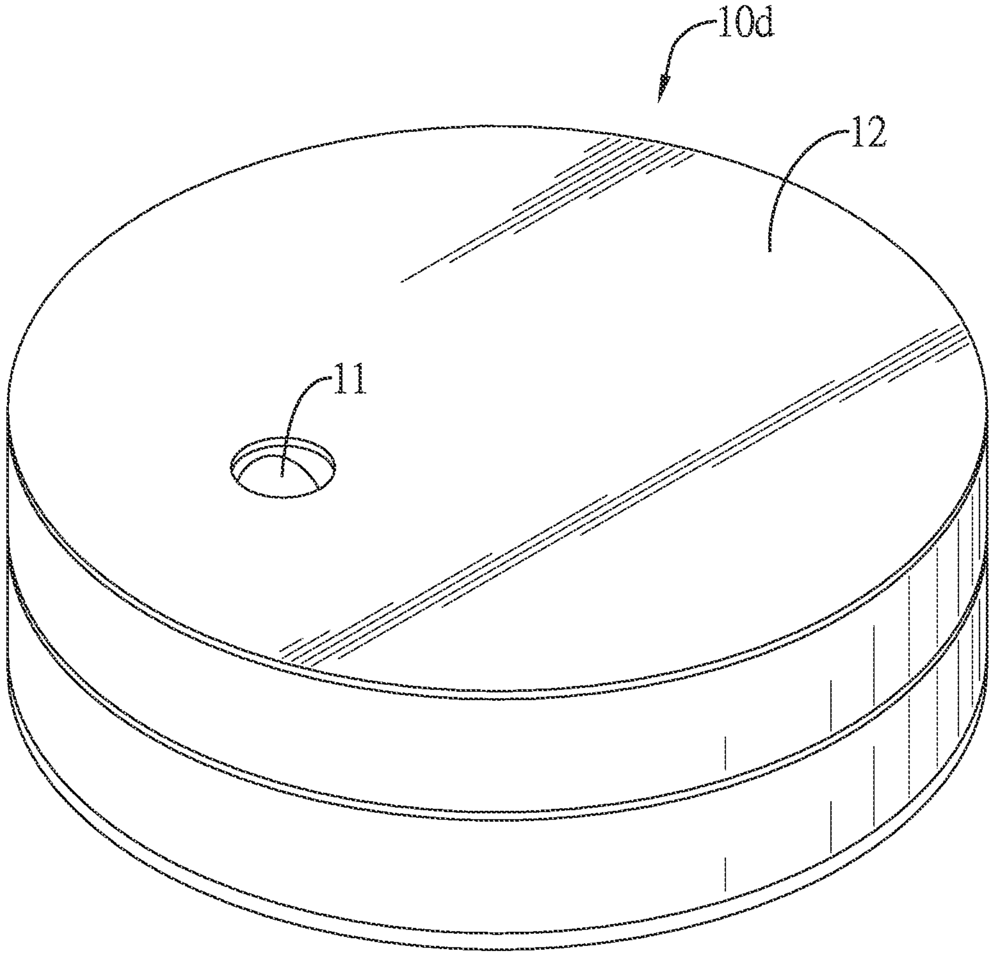
FIG. 17 is a perspective view of a fourth embodiment of the acoustic metasurface structure in accordance with the present invention.
Figure 18:
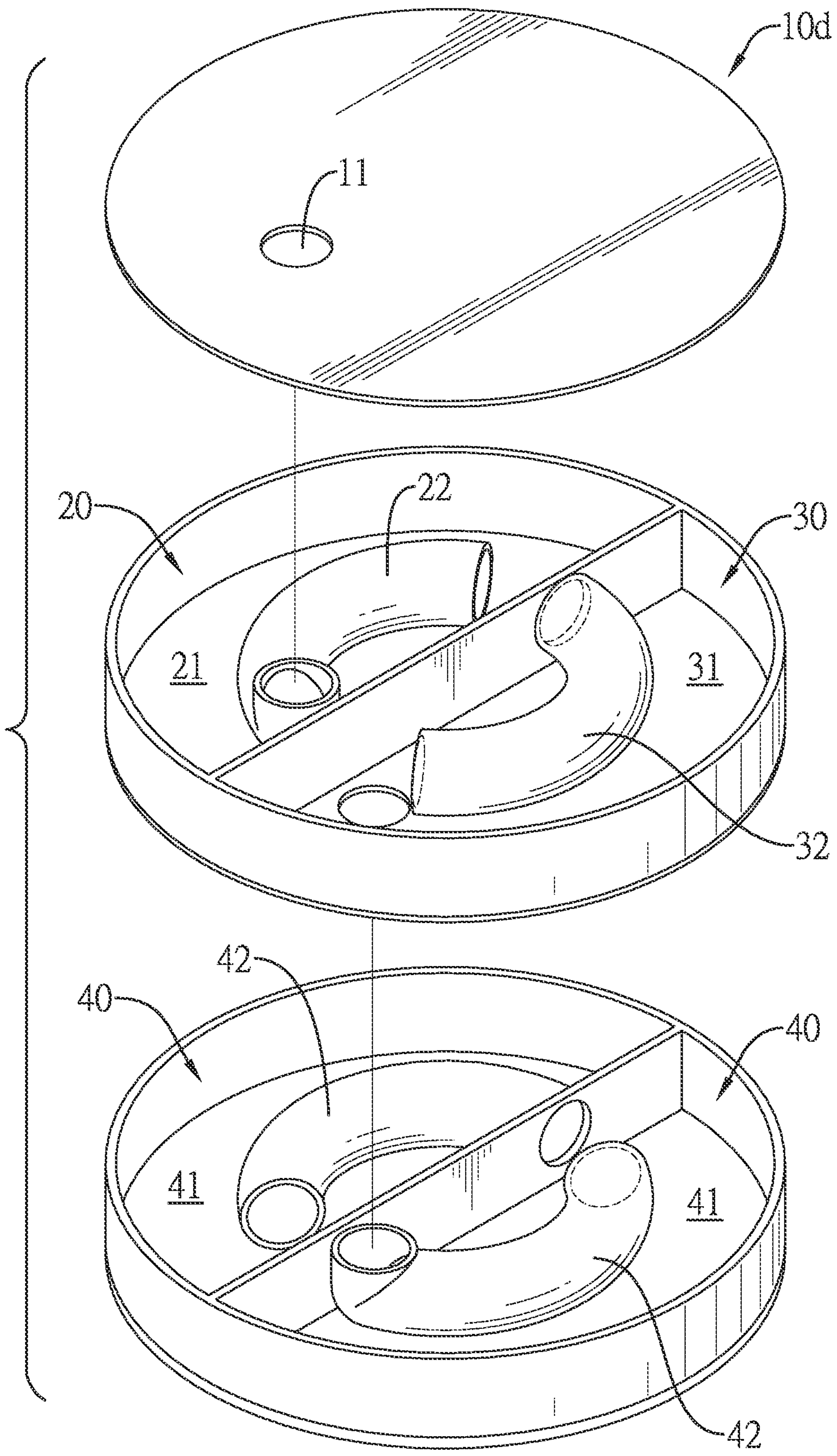
FIG. 18 is an exploded view of the fourth embodiment of the acoustic metasurface structure in accordance with the present invention.

Taking the third embodiment of the present invention as an example, the structural dimensions of the acoustic metasurface structure are set as the following: the diameter D of the main body 10*c* is 100 mm; the thicknesses t of the separating wall 13, the top cover 14, the bottom cover 15, and the outer wall 16 of the main body 10*c* are 1 mm; the cavity heights h of the externally-connecting cavity 21 and the inner cavity 31 are 16 mm; the length $l_1$ of the externally-connecting tube 22 is 74.4 mm; the length $l_2$ of the inner tube 32 is 67.4 mm; the inner diameter $d_{11}$ of the externally-connecting end 221 of the externally-connecting tube 22 is 9.2 mm; the inner diameter $d_{12}$ of the externally-opening end 222 of the externally-connecting tube 22 is 8.8 mm; the inner diameter $d_{21}$ of the inner-connecting end 321 of the inner tube 32 is 13.6 mm; the inner diameter $d_{22}$ of the inner-opening end 322 of the inner tube 32 is 5.8 mm. With reference to FIGS. 16A to 16C, diagrams show results of frequency (horizontal axis) related to absorption coefficient (vertical axis) obtained from calculating, FEA or experimenting on the acoustic metasurface structure, set with the abovementioned structural dimensions. With reference to FIG. 16A, theoretical results obtained from using the abovementioned equations to calculate with the structural dimensions are shown. With reference to FIG. 16B, FEA results are obtained by using COMSOL Multiphysics to build a finite element model in accordance with the acoustic metasurface structure and by using finite element method to analyze. With reference to FIG. 16C, experimenting results obtained from applying the acoustic metasurface structure to an impedance tube (SW422, BSWA Technology) to be experimented is shown. As shown in those diagrams and based on the experimenting results, this embodiment has an absorption coefficient peak landing on approximately 116 Hz with an absorption coefficient being 0.75. Based on the theoretical and FEA results, this embodiment has an absorption coefficient peak landing on 126 Hz with an absorption coefficient being 0.95. By the inner diameters of the externally-connecting tube 22 and the inner diameters of the inner tube 32 both changing gradually, and comparing to the first embodiment of the present invention, the absorption coefficient peak of the third embodiment of the present invention lands on a relatively low frequency under circumstances of the main body 10*c* having the same diameter. Hence, a design of gradually changing inner diameters can further lower a frequency where an absorption coefficient peak lands on. Regardless that the inner diameters of the tube increase or decrease from the connecting end to the opening end, the frequency on which the absorption coefficient peak lands will be lowered.

With reference to FIGS. 17 to 19, 20A and 20B, in a fourth embodiment of the present invention, the acoustic metasurface structure comprises multiple extending configurations 40. The multiple extending configurations 40 are connected in sequence and formed inside the main body 10*d*. Each one of the multiple extending configurations 40 has an extending cavity 41 and an extending tube 42. The extending cavities 41 of the multiple extending configurations 40 are connected in sequence. The extending tube 42 of one of the multiple extending configurations 40 is connected to the inner cavity 31 of the inner configuration 30 through an extending hole 43 formed on the main body 10*d*. The extending tube 42 of each of the other extending configurations 40 is respectively connected to the extending cavity 41 of another one of the multiple extending configurations 40.

The externally-connecting configuration 20, the inner configuration 30 and the multiple extending configurations 40 communicate with one another in sequence, so the fourth embodiment of the present invention is formed as a continuously series-type structure. That is, the fourth embodiment of the present invention is a series-type design, having four cavities communicating in sequence, and formed by the externally-connecting configuration 20, the inner configuration 30 and two of the multiple extending configurations 40 communicating in sequence, so series RLC circuits can be applied. Hence, a total acoustic impedance $Z_{total}$ of this embodiment of the acoustic metasurface structure can be expressed by the following equation:

$$Z_{total} = \xi \times \left( Z_{R1} + Z_{M1} + \frac{1}{\frac{1}{Z_{C1}} + \frac{1}{Z_{R2} + Z_{M2} + \frac{1}{Z_{C2}} + \frac{1}{Z_{R3} + Z_{M3} + \frac{1}{Z_{C3}} + \frac{1}{Z_{R4} + Z_{M4} + \frac{1}{Z_{C4}}}}}} \right)$$

Figure 19:
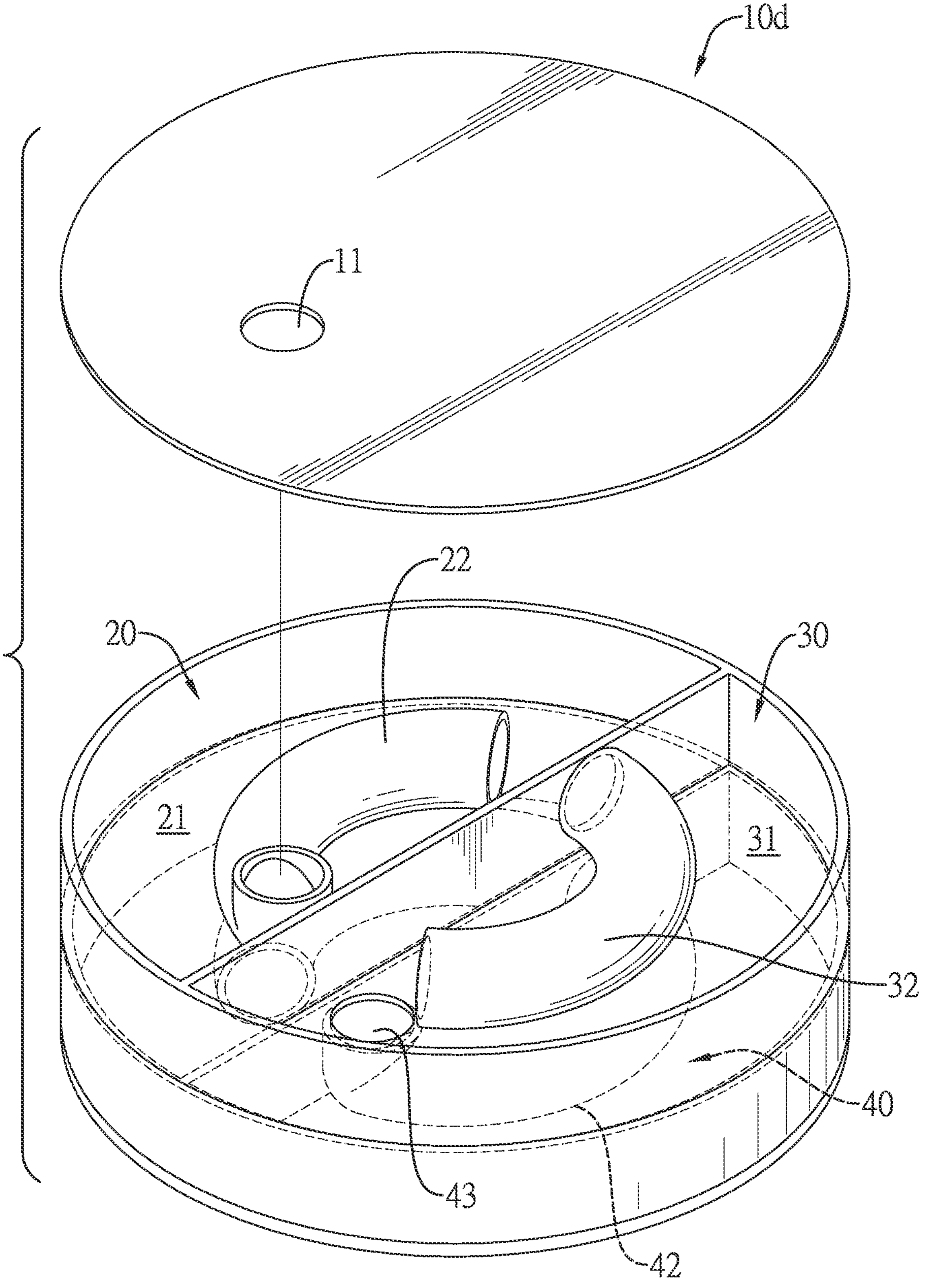
FIG. 19 is a partially exploded view of the fourth embodiment of the acoustic metasurface structure in accordance with the present invention.
Figure 20A:
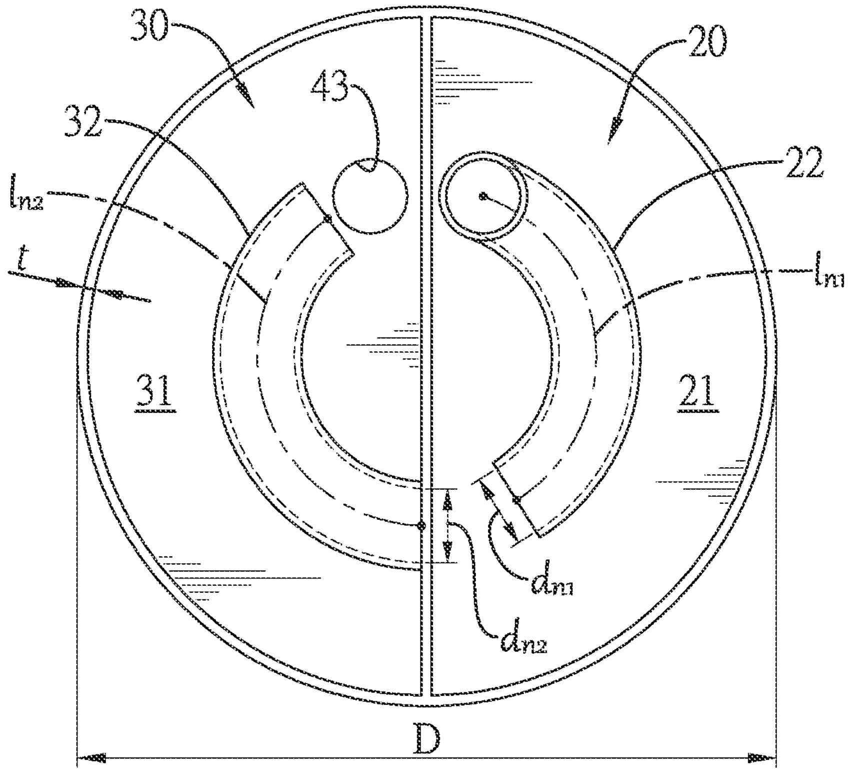
FIG. 20A is a top view of an interior of a top panel of the main body of the fourth embodiment of the acoustic metasurface structure in accordance with the present invention.
Figure 20B:
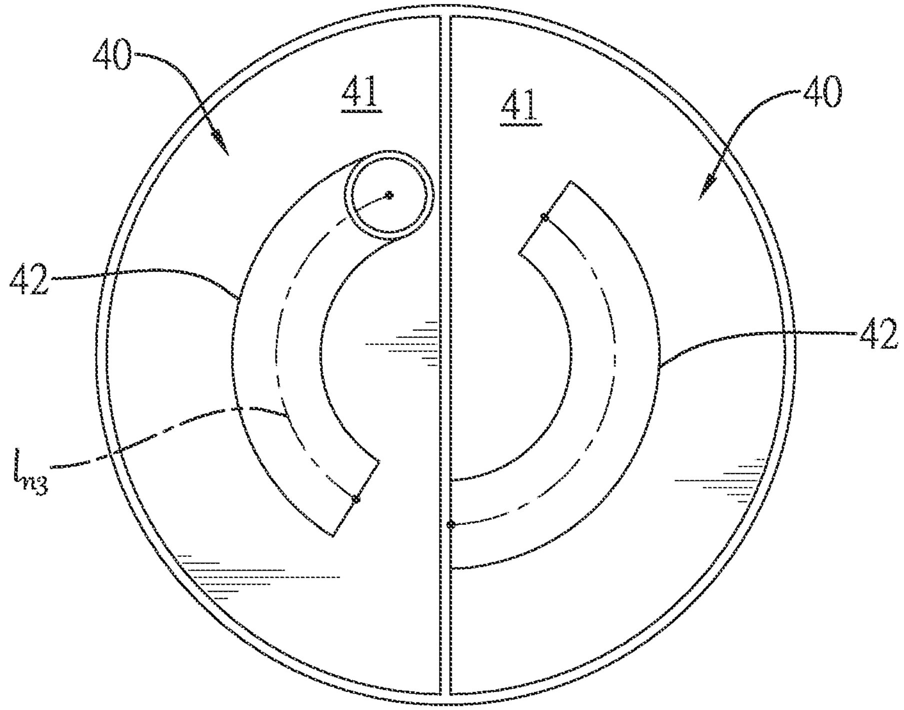
FIG. 20B is a top view of an interior of a bottom panel of the main body of the fourth embodiment of the acoustic metasurface structure in accordance with the present invention.
Figure 21A:
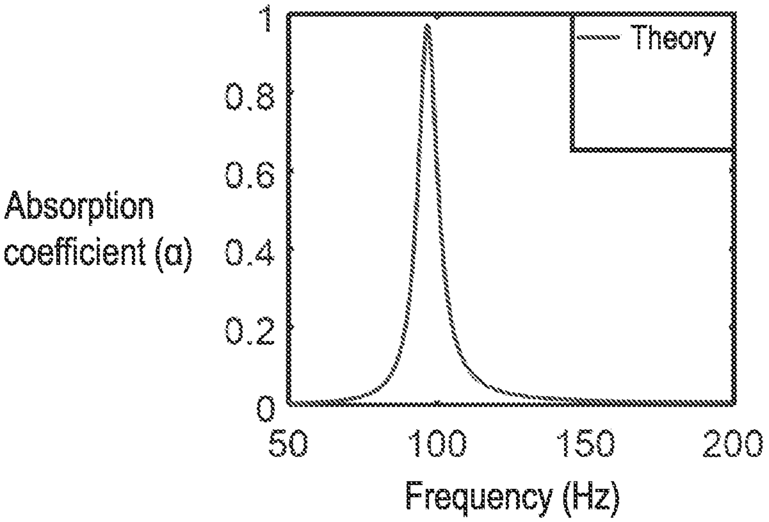
FIG. 21A is a diagram of theoretical results of the fourth embodiment of the acoustic metasurface structure in accordance with the present invention.
Figure 21B:
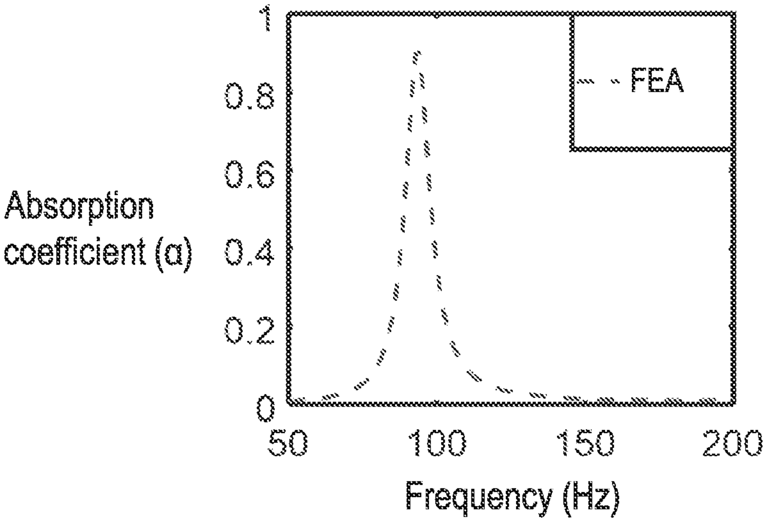
FIG. 21B is a diagram of FEA results of the fourth embodiment of the acoustic metasurface structure in accordance with the present invention.
Figure 21C:
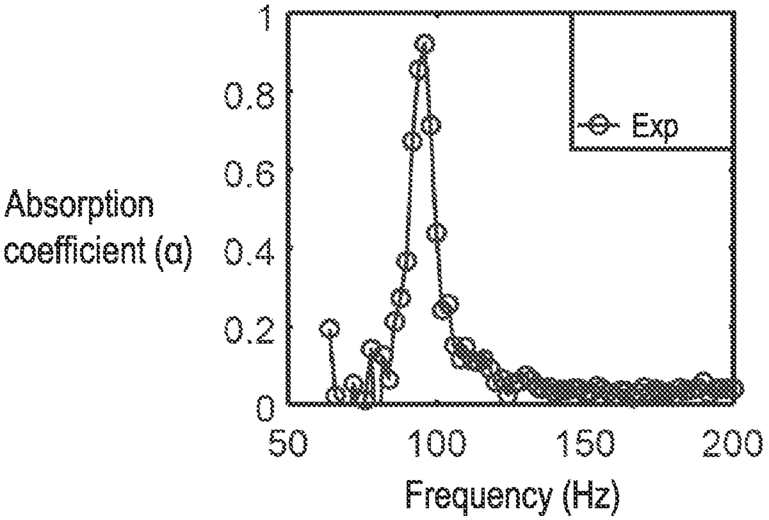
FIG. 21C is a diagram of experimenting results of the fourth embodiment of the acoustic metasurface structure in accordance with the present invention.
Figure 22:
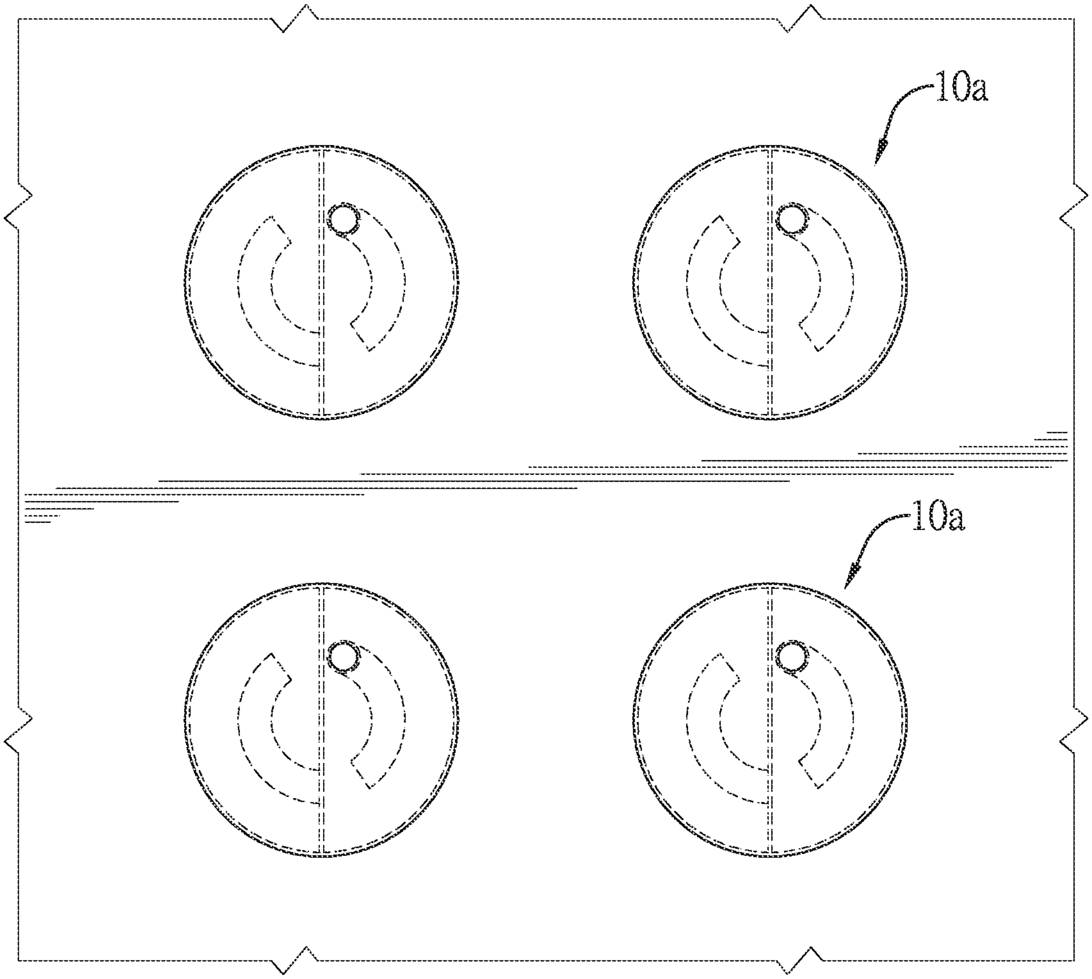
FIG. 22 is a top view of the acoustic metasurface structure, mounted on a wall.

With reference to FIGS. 19, 20A and 20B, taking the fourth embodiment of the present invention as an example, it is a double-panel series-type structure formed by connecting two of the first embodiment of the present invention in series. The diameter D of the main body 10*d* is 100 mm; the inner diameter $d_{n1}$ of the externally-connecting tube 22, the inner diameter $d_{n2}$ of the inner tube and inner diameters $d_{n3}$ of the extending tubes 42 are respectively 10 mm; the length $l_{n1}$ of the externally-connecting tube 22, the length $l_{n2}$ of the inner tube 32 and lengths $l_{n3}$ of the extending tubes 42 are respectively 61.2 mm; the thicknesses t of the separating wall 13, the top cover 14, the bottom cover 15, and the outer wall 16 of the main body 10*d* are 1.5 mm; the cavity heights h of the externally-connecting cavity 21, the inner cavity 31 and the extending cavities 41 are 14 mm. With reference to FIGS. 21A to 21C, diagrams show results of frequency (horizontal axis) related to absorption coefficient (vertical axis) obtained from calculating, FEA or experimenting on the acoustic metasurface structure set with the abovementioned structural dimensions. With reference to FIG. 21A, theoretical results obtained from using the abovementioned equations to calculate with the structural dimensions are shown. FIG. 21B shows FEA results obtained by using COMSOL Multiphysics to build a finite element model in accordance with the acoustic metasurface structure and by using finite element method to analyze. With reference to FIG. 21C, experimenting results obtained from applying the acoustic metasurface structure to an impedance tube (SW422, BSWA Technology) are shown. As shown in those diagrams, a frequency, which an absorption coefficient peak of this embodiment lands on, is 97 Hz and the absorption coefficient is 0.95. Comparing to the first embodiment, which is a single-panel structure, of the present invention, this embodiment, which is a double-panel structure, has a further lowering frequency on which the absorption coefficient peak lands. Besides, if forming a triple-panel structure by communicating three of the first embodiment of the present invention in series, which is a structure that has a series-type design with six cavities communicating in sequence, then a frequency, on which an absorption coefficient peak of the structure lands, is lowered to 60 Hz.

Furthermore, by using Particle Swarm Optimization algorithm (PSO) cooperating with the abovementioned equations, a specific sound-absorbing frequency can be set, and structural dimensions for the acoustic metasurface structure to possess a best absorption coefficient for the specific sound-absorbing frequency can be found. Therefore, the acoustic metasurface structure has an effect of sound absorption in accordance with different requirements. The acoustic metasurface structure can be applied to absorb low-frequency noises generated by mechanical processing (comprising machine tools), textile factories, and electric generators using water power, firepower and wind power. The acoustic metasurface structure can be pasted at walls of cabin engine rooms of steamships, cargo ships, merchant ships, fishing boats, yachts, warships and submarines to absorb low-frequency noises generated by engines. The acoustic metasurface structure can be mounted at outer-side surfaces of outdoor air-conditioner compressor, motors of rolling doors, and ventilation pipes to reduce noises with specific frequencies. The acoustic metasurface structure can be mounted inside air filters and mainframe computers to reduce noises from fans operating, can be mounted at a bottom side of a washing machine to reduce noises generated by motors, and can be mounted at bottom sides of vehicles of mass transportation such as metro, railway and high-speed rail, etc. to reduce noises transported into the vehicles. The acoustic metasurface structure can be applied to military bases, mounted around, for example, rocket launch pads, missile and artillery launch sites, etc., to reduce noises with specific frequencies. The acoustic metasurface structure can be mounted at an outer frame of a window to absorb noises from specific constructions or transportations. Besides, multiple said acoustic metasurface structures can be widely mounted at a wall to increase a noise-absorbing effect. Mounting multiple said acoustic metasurface structures with different structural dimensions designs together on a wall can broaden a frequency bandwidth of noise absorption.

To sum up, the acoustic metasurface structure is configured to absorb 8 sounds. By the externally-connecting configuration 20 and the inner configuration 30 forming the series-type inside the main body 10*a* to 10*d*, an acoustic impedance of the present invention is increased and frequencies, on which absorption coefficient peaks of the acoustic metasurface structure land, are lowered. Therefore, under circumstances of the main body 10*a* to 10*d* having a limited volume, an absorption coefficient of the acoustic metasurface structure toward low frequencies is increased. The acoustic metasurface structure can be viewed as a super-low-frequency sound-absorbing panel.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the board general meaning of the terms in which the appended claims are expressed.

What is claimed is:

1. An acoustic metasurface structure comprising:

a main body having a sound-absorbing hole formed at a surface of the main body; a ratio of a diameter of the main body to a diameter of the sound-absorbing hole being from 9.8:1 to 12.35:1;

an externally-connecting configuration formed inside the main body and having an externally-connecting cavity; and an externally-connecting tube disposed inside the externally-connecting cavity; two ends of the externally-connecting tube being open and in fluid communication with each other; one of the two ends of the externally-connecting tube connected to the sound-absorbing hole to communicate with an external environment; the other one of the two ends of the externally-connecting tube communicating with the externally-connecting cavity; and an inner configuration formed inside the main body and having an inner cavity; and an inner tube disposed inside the inner cavity; two ends of the inner tube being open and in fluid communication with each other; the inner tube and the externally-connecting tube spaced apart from each other; one of the two ends of the inner tube communicating with the externally-connecting cavity of the externally-connecting configuration; the inner cavity communicating with the externally-connecting cavity through the inner tube.

2. The acoustic metasurface structure as claimed in claim 1, wherein the main body has a sound-absorbing face formed at an outer side of the main body;

the sound-absorbing hole disposed on the sound-absorbing face; and a separating wall disposed inside the main body and separating the externally-connecting cavity and the inner cavity; said end, communicating with the externally-connecting cavity, of the two ends of the inner tube mounted on the separating wall.

3. The acoustic metasurface structure as claimed in claim 1, wherein the two ends of the externally-connecting tube are respectively defined as an externally-connecting end being in fluid communication with the external environment; and an externally-opening end being in fluid communication with the externally-connecting cavity; inner diameters of the externally-connecting tube changed gradually from the externally-connecting end to the externally-opening end.

4. The acoustic metasurface structure as claimed in claim 2, wherein the two ends of the externally-connecting tube are respectively defined as an externally-connecting end; and an externally-opening end; the externally-connecting end being in fluid communication with the external environment; the externally-opening end being in fluid communication with the externally-connecting cavity; inner diameters of the externally-connecting tube changed gradually from the externally-connecting end to the externally-opening end.

5. The acoustic metasurface structure as claimed in claim 1, wherein the two ends of the inner tube are respectively defined as an inner-connecting end being in fluid communication with the externally-connecting cavity; and an inner-opening end being in fluid communication with the inner cavity; inner diameters of the inner tube changed gradually from the inner-connecting end to the inner-opening end.

6. The acoustic metasurface structure as claimed in claim 4, wherein the two ends of the inner tube are respectively defined as an inner-connecting end being in fluid communication with the externally-connecting cavity; and an inner-opening end being in fluid communication with the inner cavity; inner diameters of the inner tube changed gradually from the inner-connecting end to the inner-opening end.

7. The acoustic metasurface structure as claimed in claim 1, wherein the acoustic metasurface structure comprises multiple extending configurations connected in sequence and formed inside the main body; each one of the multiple extending configurations having an extending cavity; the extending cavities of the multiple extending configurations connected in sequence; and an extending tube; the extending tube of one of the multiple extending configurations connected to the inner cavity of the inner configuration; the extending tube of each of the other extending configurations respectively connected to the extending cavity of another one of the multiple extending configurations.

8. The acoustic metasurface structure as claimed in claim 6, wherein the acoustic metasurface structure comprises multiple extending configurations connected in sequence and formed inside the main body; each one of the multiple extending configurations having an extending cavity; and an extending tube; the extending tube of one of the multiple extending configurations connected to the inner cavity of the inner configuration; the extending tube of each of the other extending configurations respectively connected to the extending cavity of another one of the multiple extending configurations.

9. The acoustic metasurface structure as claimed in claim 1, wherein the externally-connecting tube and the inner tube are curved.

10. The acoustic metasurface structure as claimed in claim 8, wherein the externally-connecting tube and the inner tube are curved.

11. The acoustic metasurface structure as claimed in claim 1, wherein the externally-connecting cavity and the inner cavity are adjacent to each other on a horizontal reference plane; the externally-connecting tube communicates with the external environment along a Z direction; the inner tube communicates with the externally-connecting cavity along an X direction; the Z direction is perpendicular to the horizontal reference plane; the X direction is parallel to the horizontal reference plane.

12. The acoustic metasurface structure as claimed in claim 8, wherein the externally-connecting cavity and the inner cavity are adjacent to each other on a horizontal reference plane; the externally-connecting tube communicates with the external environment along a Z direction; the inner tube communicates with the externally-connecting cavity along an X direction; the Z direction is perpendicular to the horizontal reference plane; the X direction is parallel to the horizontal reference plane.

13. The acoustic metasurface structure as claimed in claim 10, wherein the externally-connecting cavity and the inner cavity are adjacent to each other on a horizontal reference plane; the externally-connecting tube communicates with the external environment along a Z direction; the inner tube communicates with the externally-connecting cavity along an X direction; the Z direction is perpendicular to the horizontal reference plane; the X direction is parallel to the horizontal reference plane.

14. The acoustic metasurface structure as claimed in claim 11, wherein the externally-connecting tube comprises an externally-connecting segment elongating along the Z direction; and an elongating segment connected the externally-connecting segment and elongating along the horizontal reference plane.

15. The acoustic metasurface structure as claimed in claim 13, wherein the externally-connecting tube comprises an externally-connecting segment elongating along the Z direction; and an elongating segment connected the externally-connecting segment and elongating along the horizontal reference plane.

16. The acoustic metasurface structure as claimed in claim 11, wherein the main body is disc-shaped and the diameter of the main body is on the horizontal reference plane;

the externally-connecting cavity having an external-cavity height along the Z direction; the inner cavity having an inner-cavity height along the Z direction; the external-cavity height of the externally-connecting cavity and the inner-cavity height of the inner cavity being equal.

17. The acoustic metasurface structure as claimed in claim 12, wherein the main body is disc-shaped and the diameter of the main body is on the horizontal reference plane;

the externally-connecting cavity having an external-cavity height along the Z direction; the inner cavity having an inner-cavity height along the Z direction; the external-cavity height of the externally-connecting cavity and the inner-cavity height of the inner cavity being equal.

18. The acoustic metasurface structure as claimed in claim 13, wherein the main body is disc-shaped and the diameter of the main body is on the horizontal reference plane;

the externally-connecting cavity having an external-cavity height along the Z direction; the inner cavity having an inner-cavity height along the Z direction; the external-cavity height of the externally-connecting cavity and the inner-cavity height of the inner cavity being equal.

19. The acoustic metasurface structure as claimed in claim 14, wherein the main body is disc-shaped and the diameter of the main body is on the horizontal reference plane;

the externally-connecting cavity having an external-cavity height along the Z direction; the inner cavity having an inner-cavity height along the Z direction; the external-cavity height of the externally-connecting cavity and the inner-cavity height of the inner cavity being equal.

20. The acoustic metasurface structure as claimed in claim 15, wherein the main body is disc-shaped and the diameter of the main body is on the horizontal reference plane;

the externally-connecting cavity having an external-cavity height along the Z direction; the inner cavity having an inner-cavity height along the Z direction; the external-cavity height of the externally-connecting cavity and the inner-cavity height of the inner cavity being equal.

* * * * *